United States Patent
Breen et al.

(10) Patent No.: US 8,065,410 B1
(45) Date of Patent: Nov. 22, 2011

(54) METHODS AND APPARATUS FOR COLLECTING PERFORMANCE METRICS FROM A WEB SITE

(75) Inventors: William Ryan Breen, Melrose, MA (US); Christopher M. Shaw, Danvers, MA (US)

(73) Assignee: Compuware Corporation, Detroit, MI (US)

( * ) Notice: Subject to any disclaimer, the term of this patent is extended or adjusted under 35 U.S.C. 154(b) by 789 days.

(21) Appl. No.: 11/223,264

(22) Filed: Sep. 9, 2005

Related U.S. Application Data

(63) Continuation-in-part of application No. 11/094,338, filed on Mar. 30, 2005, now abandoned.

(60) Provisional application No. 60/592,813, filed on Jul. 30, 2004, provisional application No. 60/557,994, filed on Mar. 31, 2004.

(51) Int. Cl.
*G06F 15/173* (2006.01)
*G06F 15/16* (2006.01)
*G06F 11/30* (2006.01)
*G06F 11/00* (2006.01)

(52) U.S. Cl. ........ 709/224; 709/202; 709/217; 702/182; 702/186; 702/188

(58) Field of Classification Search .................. 709/224
See application file for complete search history.

(56) References Cited

U.S. PATENT DOCUMENTS

| | | | |
|---|---|---|---|
| 6,006,260 A * | 12/1999 | Barrick et al. ............. | 709/224 |
| 6,449,739 B1 * | 9/2002 | Landan ..................... | 714/47 |
| 6,697,969 B1 * | 2/2004 | Merriam .................... | 714/46 |
| 6,763,386 B2 | 7/2004 | Davis et al. | |
| 6,810,494 B2 * | 10/2004 | Weinberg et al. ............ | 714/46 |
| 6,886,132 B1 | 4/2005 | Hall et al. | |
| 6,973,490 B1 * | 12/2005 | Robertson et al. ........... | 709/224 |
| 7,034,835 B2 | 4/2006 | Whatmough | |
| 7,043,546 B2 | 5/2006 | Smith et al. | |
| 7,051,098 B2 | 5/2006 | Masters et al. | |
| 7,069,177 B2 | 6/2006 | Carley | |
| 7,076,495 B2 | 7/2006 | Dutta et al. | |
| 7,231,442 B2 * | 6/2007 | Chen ......................... | 709/224 |
| 7,330,887 B1 | 2/2008 | Dharmadhikari | |
| 7,373,376 B1 | 5/2008 | Hamer et al. | |
| 7,389,330 B2 * | 6/2008 | Dillon et al. ................. | 709/219 |
| 7,392,321 B1 | 6/2008 | Wolf et al. | |
| 7,406,628 B2 | 7/2008 | Edgar et al. | |

(Continued)

OTHER PUBLICATIONS

United States Office Action, U.S. Appl. No. 12/727,004, Dec. 2, 2010, sixteen pages.

(Continued)

*Primary Examiner* — Jeffrey Pwu
*Assistant Examiner* — Jasmine Myers
(74) *Attorney, Agent, or Firm* — Fenwick & West LLP

(57) ABSTRACT

A system provides an agent that executes remotely from a web site and can measure performance associated with the web site. The agent obtains a script containing at least one transaction to be performed with the web site. The transaction(s) define a sequence of page requests identifying web pages to obtain from the web site. The agent executes the script to perform the transaction with the web site. Performance of the transaction includes retrieving the sequence of web pages and identifying respective performance metrics including performance metrics associated with obtaining respective objects defined within each web page, and performance metrics associated with obtaining a complete version of each web page. The agent transmits the performance metrics associated with execution of the transaction defined by the script to a repository.

21 Claims, 8 Drawing Sheets

U.S. PATENT DOCUMENTS

| | | | |
|---|---|---|---|
| 7,451,391 | B1 | 11/2008 | Coleman et al. |
| 7,558,795 | B2 | 7/2009 | Malik et al. |
| 7,584,435 | B2 | 9/2009 | Bailey et al. |
| 7,765,295 | B2 | 7/2010 | Anastas et al. |
| 2001/0010059 | A1* | 7/2001 | Burman et al. ............... 709/224 |
| 2002/0174214 | A1 | 11/2002 | Carl et al. |
| 2003/0005044 | A1 | 1/2003 | Miller et al. |
| 2003/0046029 | A1 | 3/2003 | Wiener et al. |
| 2003/0046383 | A1 | 3/2003 | Lee et al. |
| 2003/0046385 | A1 | 3/2003 | Vincent |
| 2003/0065763 | A1* | 4/2003 | Swildens et al. ............. 709/224 |
| 2003/0131098 | A1* | 7/2003 | Huntington et al. .......... 709/224 |
| 2003/0208593 | A1 | 11/2003 | Bharati et al. |
| 2003/0229677 | A1* | 12/2003 | Allan ............................ 709/217 |
| 2003/0229900 | A1 | 12/2003 | Reisman |
| 2004/0031058 | A1 | 2/2004 | Reisman |
| 2004/0110490 | A1 | 6/2004 | Steele et al. |
| 2004/0160445 | A1 | 8/2004 | Whatmough |
| 2004/0167749 | A1 | 8/2004 | Friedman et al. |
| 2005/0086587 | A1 | 4/2005 | Balz |
| 2005/0187950 | A1 | 8/2005 | Parker et al. |
| 2005/0223285 | A1* | 10/2005 | Faihe et al. ..................... 714/25 |
| 2007/0250618 | A1 | 10/2007 | Hammond |
| 2008/0086454 | A1 | 4/2008 | Bahadori et al. |
| 2008/0288827 | A1 | 11/2008 | Chagoly et al. |
| 2009/0228572 | A1 | 9/2009 | Wall et al. |
| 2010/0095208 | A1 | 4/2010 | White et al. |

OTHER PUBLICATIONS

Whitmer et al., Document Object Model (DaM) Level 3 XPath Specification, published on the web by W3C.org, Feb. 26, 2004, pp. 1-32.

Document Object Model, Wikipedia Encyclopedia, pp. 1-4.

Palme, J., et al., "MIME Encapsulation of Aggregate Documents, such as HTML (MHTML)," Mar. 1999, pp. 1-25.

Sigurdsson, K., et al., "Heritrix User Manual," May 24, 2004, pp. 1-46.

\* cited by examiner

METHODS AND APPARATUS FOR COLLECTING PERFORMANCE METRICS FROM A WEB SITE

CROSS REFERENCE TO RELATED APPLICATIONS

This Patent Application is a Continuation-in-Part of U.S. patent application Ser. No. 11/094,338 filed on Mar. 30, 2005 now abandoned, entitled, "METHOD AND APPARATUS FOR MEASURING AND REPORTING LOADING SPEED OF INFORMATION OVER COMPUTER NETWORKS" which claims benefit of U.S. Provisional Application No. 60/557,994 filed on Mar. 31, 2004, entitled, "METHOD AND APPARATUS FOR MEASURING AND REPORTING LOADING SPEED OF INFORMATION OVER COMPUTER NETWORKS" and U.S. Provisional Application No. 60/592,813 filed on Jul. 30, 2004, entitled, "SCRIPTABLE TRANSACTION AGENT". The contents and teachings of each of these hereby incorporated by reference in their entirety.

BACKGROUND

Computer systems coupled to a data communications network such as the Internet allow for the exchange of a wide variety of information between users of such computer systems. One popular use of computer networks such as the Internet allows users to operate client communications software known as a web browser to communicate with remote computer systems known as web servers in order to browse web pages on the World Wide Web. The World Wide Web is generally a collection of web server computer systems that each operates web server software that communicates using a number of different data communications protocols and data formats to allow each user's browser to make web page requests to the web servers. In response to these web page requests, web servers obtain (e.g., from storage, or via dynamic generation) the requested web pages and serve those pages back to each user's web browser for viewing by the user.

A typical web page is written in a markup language such as the Hypertext Markup Language (HTML) and includes a number of embedded objects referenced by respective Uniform Resource Locators (URLs) within the HTML of a web page. The web page itself is generally referenced by a URL as well. When a user provides a URL to a web browser of a web page, the web browser performs a detailed sequence of processing tasks to obtain that web page. As an example, if the URL of the web page identifies a domain name of a server computer system on the Internet, the web browser must first perform a Domain Name Service (DNS) lookup of the domain name to resolve this alphanumeric name into the Internet Protocol (IP) address of the web server on the Internet that can serve the page referenced by the URL. Once this DNS lookup is complete, the web browser establishes a connection to the web server (e.g., a Transmission Control Protocol or TCP connection) and uses a Hypertext Transport Protocol (HTTP) to transmit a web page GET request over the connection to the web server. The HTTP GET request contains the URL of the web page to be served by the server. The web server receives this HTTP GET request, obtains or dynamically generates the web page, and returns the web page as HTML to the web browser in an HTTP response message over the connection.

As the web browser receives the HTML for the web page, the HTML of the web page may include many embedded URL's that define other objects within the web page to be obtained by web browser. As an example, a graphic or image embedded within the web page is typically referenced with an embedded URL that specifies a server and location within the server of that graphic or image. As the web browser encounters objects such as embedded URL's within the web page, the web browser repeats the sequence of processing described above the URL for the web page in order to obtain each embedded object, this can include performing a DNS lookup of the domain name specified in the URL (if that domain name was not previously resolved), establishing a connection to a server and initiating an HTTP get request to obtain the content associated with the embedded URL. Modern web pages often contain many embedded objects and URLs that reference these objects often specify different server computer systems from which to obtain these objects. As a result, the process of obtaining the complete content associated with a single web page including all embedded objects involves significant processing and communications activities.

Sophisticated web server software systems allow a user to visit the web site using his or her browser in order to perform transactions within the web site such as purchasing goods or services. Performance of the transaction with a web site typically involves the user operating the web browser to initially navigate to the homepage of the commercial web site. From the homepage, the user is able to further navigate to other pages associated with the web site in order to perform the transaction, such as, for example, selecting goods or services to be placed into an electronic or virtual shopping cart maintained within the web server. When the user has completed the selection of goods and services to be purchased, the user can further navigate within the web site to one or more purchasing web pages that allow the user, for example, to enter credit card information for payment of the selected goods and services. The web server software is able to process the credit card payment and allow or deny the purchase of the selected goods and services to complete the transaction. A single transaction might involve visiting and providing user input to a sequence of many web pages.

Other types of transactions might involve navigating through a sequence of web pages to obtain desired content, performing searches for user specified information, and so forth. Depending upon the purpose of the web site, a typical user transaction can involve a user visiting a number of pages and providing user input on those pages. The web server often uses input from one or more pages to produce successive web pages in a given transaction.

Many organizations such as corporations, universities and web-based businesses rely heavily on the ability of their web site to properly perform transactions without errors. Because of the importance of ensuring that such web sites are operating properly, software developers have produced a number of conventional tools to exercise and test a web site and measure the performance of that web site's ability to process user transactions correctly and efficiently.

One conventional web site testing and performance measurement tool and is a first generation web site testing tool and is also referred to herein as a single web page test tool. A first generation single web page test tool allows an operator of the tool to provide a single URL of a single web page to the tool. In response to receiving this URL, the tool is able to initiate a web page request for the web page located at the URL and is able to measure and collect certain performance ratings of the web site with respect to how fast the web server returns the web page in response to initiating the request for the web page using the URL. As an example, one conventional performance measurement tool is able to initiate a request for a web page and track the amount of time required to establish a connection to the web server that serves that web page. Additionally, the conventional first generation single page test tool is able to determine the amount of time required to begin receiving data for the web page and the amount of time required for the entire web page to be delivered back to the test tool. Additionally, the conventional test tool is able to parse hypertext markup language (HTML) to determine if the web page was properly returned from the web server.

More sophisticated second generation web server performance and testing tools provide the ability to specify a sequence of web pages to be obtained from a web site. Such conventional web testing tools are referred to as second generation web testing tools and operate by wrapping an actual web browser with a software program to essentially remotely control the web browser using software application programming interfaces (APIs) to cause the browser under control of the test tool to visit sequence of pages to perform a transaction with web server.

SUMMARY

Conventional technologies for measuring and testing the performance of transactions on web sites suffer from a variety of deficiencies. In particular, a key weakness of the conventional first generation tools is that they can not parse JavaScript and therefore miss many page objects, which limits the ability to accurately measure page performance. While conventional second generation web testing tools offer the ability to remotely control browser software to perform an entire transaction associated with web site, the granularity or amount of detail that can be obtained concerning the performance of the web site by such conventional second generation tools is significantly lacking on a page by page basis in comparison to the first generation single page web testing tools. In the background above, it was noted that conventional first generation single page web testing tools are capable of collecting detailed performance ratings for a single web page. The reason the first generation single page web test tools are able to do this is because the test tool is specifically written to measure the timing metrics for that single individual page. Such conventional single page tools are not readily adaptable to collecting such metrics for entire sequence of pages involved in a complex transaction with a sophisticated web site. This is because the single page web test tools do not fully emulate a web browser and are not fully capable of maintaining web browser state information such as cookies or other data that are often required when carrying out a multi-page web server based transaction.

While the conventional second generation web testing tools can control an actual browser to perform transactions, the amount and granularity or detail of data that is available using software application programming interfaces that control the browser severely limits the amount of details concerning the performance of a web transaction on a page by page and object by object basis. As an example, using conventional web testing and performance measurement tools, there is no way to query a conventional web browser to inquire as to the amount of time required to obtain the first byte of data from a web server for a particular web page requested with a URL. Likewise, no data is available from a wrapper driven browser concerning detailed metrics for each object in that page. Accordingly, though the second generation web testing tools can indicate whether or not a transaction was able to be successfully completed with a web site as a whole (i.e., that all pages were obtained), such tools lack the ability to provide detailed performance metrics concerning individual pages or objects loaded during the transaction.

Embodiments of the invention significantly overcome these and other deficiencies associated with conventional web site testing and performance measurement systems and provide a system, methods and apparatus that includes an agent such as a software process that executes remotely from a web site and is operable to measure performance and operability of the web site. The agent is able to exercise a full transaction with a web site while at the same time obtaining a level of granularity including detailed performance metrics associated with each web page and each object embedded within those web pages for the entire transaction.

As an example, the typical transaction with a web site might involve visiting ten pages. Each of those pages might references numerous objects and require sophisticated user input to complete the transaction. An agent configured in accordance with embodiments of the invention described herein is able to remotely operate the full transaction while collecting details performance metrics. For each page within the transaction, the agent is able to track and measure detailed performance metrics associated with that web page and associated with each object referenced by that web page. As an example, the agent as disclosed herein is able to track time requirements to perform DNS lookups for URLs and is also able to track and measure amounts of time required to receive a first byte of the web page and the first byte of each object embedded within that web page, as well as full amount of time required to receive each object associated with the web page, as well as the time required to obtain the entire web page. The agent can track many other metrics as will be explained in detail herein.

The agent described herein is preferably embodied as a software application and executes as a software process on a computer system coupled to the communications network such as the Internet. The agent executes autonomously and emulates a full functionality of a web browser as opposed to wrapping and remotely controlling a third party web browser, as is done in conventional second generation web site testing systems. In other words, the agent described herein includes software code written from the ground up to fully emulate functionality of a browser as required to perform complex transactions with web site. Since the agent does not merely remotely control a browser such as Internet Explorer (made by Microsoft Corporation of Redmond, Wash., USA), developers of embodiments of the invention were able to build a sophisticated performance metrics tracking system from the ground up to enable the collection of detailed performance data concerning all aspects of a web based transaction. As a result, the amount of information obtained concerning the performance and execution of a transaction with a web site using embodiments of the invention is significantly more advanced than conventional first or second generation web testing tools.

The agent apparatus, processing and system described herein is script-based. Thus the agent can execute remotely as an autonomous process on a computer system located anywhere in the world that is coupled to the Internet. In one configuration of the system, there are many agent distributed throughout the world on different agent computer systems that can each operate scripts to test web sites from that geographic area. Many agents can operate on a single computer to provide the ability to concurrently execute many scripts.

The agent is capable of receiving a script that defines a sequence of page requests associated with the transaction to be performed with a web site. Each page request defined in a script can identify a particular web page to be obtained from a web server and can further defined expected web page data that indicates to the agent certain data that should be present within the returned web page from a web server. This allows the agent to verify the contents of the web page associated with the page requests against the expected web page data to verify if at least a portion of the contents of the web page is consistent with the expected web page data. Additionally, the script can include post script data that defines emulated user input to be provided to the page to simulate or emulate user activity and input of the transaction with respect to that web page. As will be explained in detail herein, after the page is successfully received by the agent and the performance metrics have been collected with respect to obtaining all embedded objects within that web page, the agent can obtain the post script data that defines the user simulated input to be provided to the page and is able to invoke the post script data against the web page to provide input to the web page to simulate a user activity of the transaction. In this manner, embodiments of the invention are able to fully simulate all types of user interactivity with web pages. In one configuration, the post script data within the script that defines the simulated user input is JavaScript that the agent executes to simulate user activity against the web page.

Configurations of the invention as disclosed herein thus provide an agent that executes remotely from a web site and measures performance associated with a web site by obtaining a script containing at least one transaction to be performed with the web site. The transaction(s) defined in the script define a sequence of page requests identifying web pages to obtain from the web site. The agent executes the script to perform the transaction with the web site. Performance of the transaction includes retrieving the sequence of web pages and identifying respective performance metrics including i) performance metrics associated with obtaining respective objects defined within each web page; and ii) performance metrics associated with obtaining a complete version of each web page.

In a bit more detail, in one configuration each page request in the script specifies a uniform resource locator of a web page on the web site associated with the transaction. Executing the script to perform the transaction with the web site comprises, for each page request defined in the script, issuing a request for the web page to be served from the web site using the uniform resource locator specified in the page request. During retrieval of the web page, the agent detects objects embedded in that web page. For each object embedded in the web page, the agent issues a request to obtain the object embedded in the web page using a uniform resource locator for that object as specified in the web page and tracks respective performance metrics related to obtaining that object using the uniform resource locator for that object as specified in the web page.

As an example, depending upon the configuration, the agent is able to track a time to obtain a first object byte of that object at the agent in response to issuing the request to obtain the object. The agent can also track a total object time to obtain a complete version of content for that object at the agent in response to issuing a request to obtain the object and can track a number of bytes obtained for that object. The agent can also track a content type of that object that indicates a type of object downloaded using the uniform resource locator for that object as specified in the web page. The agent can identify, in the performance metrics, the uniform resource locator host and uniform resource locator page used to obtain the object and can further identify a response code associated with downloading the object. The response code indicates success or failure of downloading that object. The agent is able to track detailed performance metrics for each object within each page of the transaction.

Accordingly, the amount of performance metrics and granularity of data collected concerning performing a transaction with a web site is significantly more advanced than any conventional web site performance measurement systems. After retrieving pages in a transaction, which includes calculating, tracking and measuring the performance metrics for each page of that transaction, the agent transmits the performance metrics associated with execution of the transaction defined by the script to a repository. Thereafter, the agent can perform processing briefly discussed above to validate the contents of the web page and to simulate user input to the web page using post script user data defined in the page request for that page as specified in the script that defines the transaction. Further details of these and other processing operations will be described in detailed description section that follows.

Other embodiments of the invention include any type of computerized device, workstation, handheld or laptop computer, or the like configured with software and/or circuitry (e.g., a processor) to process any or all of the agent operations disclosed herein. In other words, a computerized device or a processor that is programmed or configured to operate in accordance with the system as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a communications interface, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application and that the agent can execute in any type of computer system. Example embodiments of the invention may be implemented within products and/or software applications manufactured by Gomez, Inc. of Lexington, Mass., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
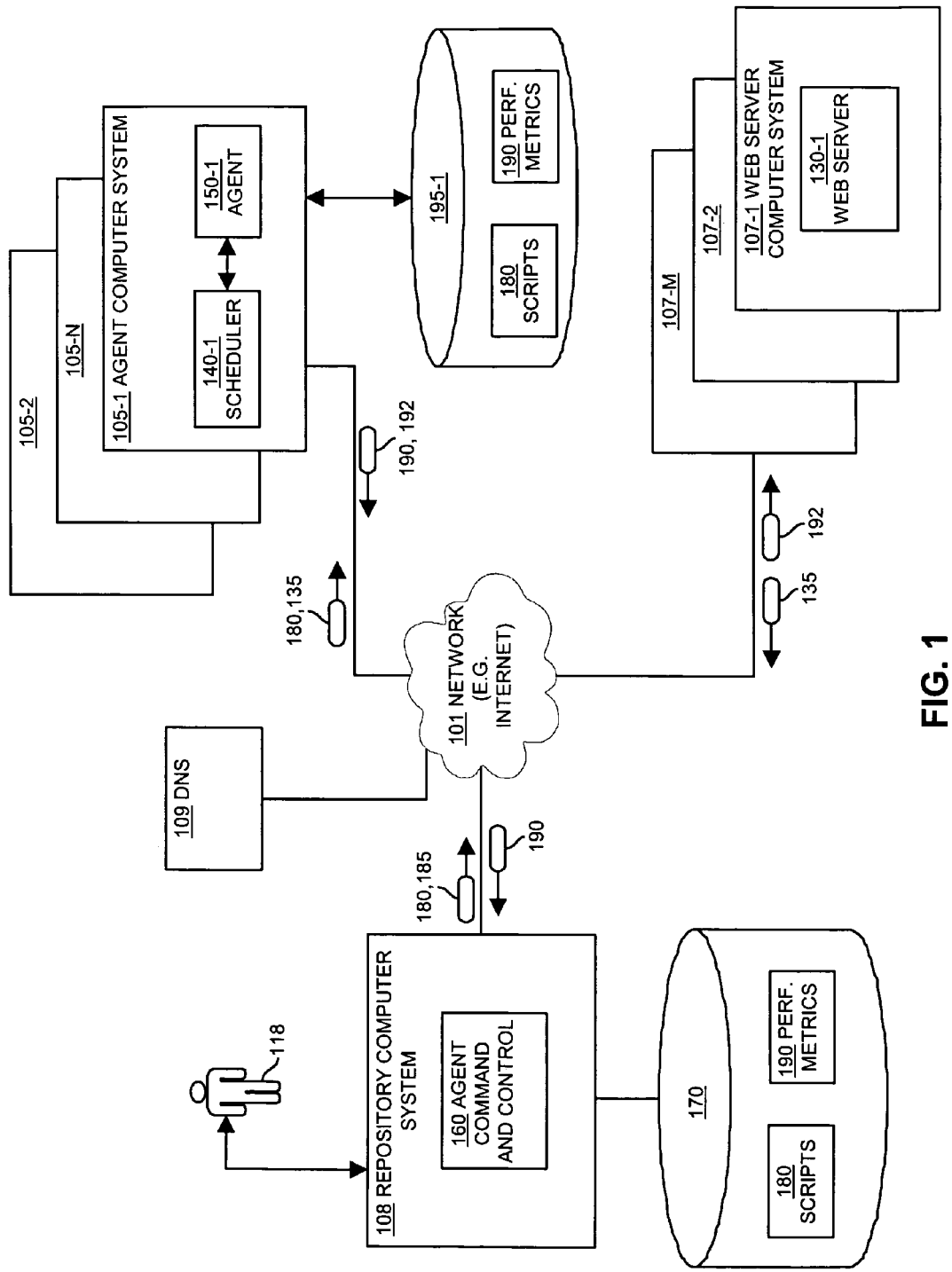
FIG. 1 is a block diagram of an example network environment that operates agents configured in accordance with embodiments of the invention.

FIG. 1 illustrates a computer network environment 100 suitable for use in explaining example embodiments of the invention. The computer network environment 100 includes a computer network 101 such as the Internet that couples a plurality of agent computer systems 105-1 through 105-N to a plurality of web server computer systems 107-1 through 107-M. The agent computer systems 105 each operate a respective scheduler 140 (there may be more than one) and one or more agents 150. The web server computer systems 107 each operate a respective web server 130. The agents 150 and web servers 130 may be software applications that execute on the respective computer systems 105 and 107. The network 101 also couples a repository computer system 108 that operates an agent command and control process 160 under guidance of an operator 118. The agent command and control process 160 maintains a repository 170 such as a database that stores scripts 180 to be executed by the agents 150 and performance metric data 190. The network 101 also includes one or more domain name server computer systems 109 to operate according to the DNS protocol. The agent computer systems 105 he may be located across a broad geographic area such as throughout the United States or throughout the entire world. This scheduler 140 and agents 150 operate as autonomous software processes on the agent computer systems 105 and can be remotely controlled by the agent command and control process 160 as explained herein.

As noted in the summary above, the agents 150 are operable to obtain one or more scripts 180 from the agent command and control process 160. Each script defines one or more transactions that may be performed with one or more of the web servers 130 operating in the web server computer systems 107. As a brief example, the web servers 130 may be commercial web servers operated by business organizations that sell goods or services on the Internet. The business organizations may pay a fee to have a script 180 developed by the operator (e.g., the assignee of the present invention) to perform various transactions with the web servers 130. Once the operator 118 has created a script 180 and that encapsulated information associated with performance of the transaction with the web server 130, the agent command and control process 160 can propagate and script to the agent computer systems 105 for receipt by the scheduler 140. The scheduler 140 receives the script 180 and places in any script database that is local to the agent computer system 105. The scheduler 140 also receives scheduling information 185 from the agent command and control process 160 that indicates how frequently scheduler 140 should activate or execute the script 180 within an agent 150. In one configuration scheduling information 185 may be embedded within the script 180.

Upon occurrence of the time to execute the script 180, the scheduler 140 provides the script 180 from the script database 195 to the agent 150 for execution. As will be explained in detail, the agent 156 is able to execute the transaction(s) defined within the script 180 in conjunction with the web server 130 to perform the scripted transaction on the web site of the business organization. During performance of the transaction, the agent 150 is able to collect detailed performance metrics 190 concerning all aspects performance of the transaction with respect each web page involved in the transaction.

Prior to providing a description herein of the detailed processing steps performed by the agent 150 to process a script 180 to carry out a transaction with a web server 130, an examples script 180 is provided below along with the brief explanation of its contents and sections in order to assist in understanding the remaining discussion.

---

[800:] <Transaction name="Wachovia" doObjectDownloads="true"
doPageSummary="false" deadLine="30000000">
[802-1]: <PageRequest url="http://www.wachovia.com/" method="GET"
header="User-Agent: Mozilla/4.0 (compatible; MSIE 5.01; GomezAgent
2.0; Windows NT)"
[808-1:]
post_script="ZG9jdW1lbnQuZm9ybXNbInVpZEF1dGhGb3JtIl1bInVzZXJpZCJdLnZhbH
V1PSJwYXR1bnRzQXJ1RnVuSI7CmRvY3VtZW50LmZvcm1zWyJ1aWRbdXRoRm9ybSJdWyJwY
XNzd29yZCJdLnZhbHV1PSJkb1lvdVRoaW5rV2Xb3VsZEx1YXZ1UmVhbERhdGFJbkh1cmU/
IjsKZG9jdW1lbnQuZm9ybXNbInVpZEF1dGhGb3JtIl1bInN5c3R1bXRhcmdldCJdLm9wdG1
vbnNbIjIiXS5zZWxlY3R1ZD10cnVlOwpkb2N1bWVudC5mb3Jtc1sidWlkQXV0aEZvcm0iXS
5zdWJtaXQoKTs="
pre_script="b2JqID0gewoKICAgICByZXBseUNyZWF0ZWQ6IGZ1bmN0aW9uKHJ1cGx5KSB
7CiAgICAgICAgICBpZiAocmVwbHkuZ2V0U3RhdHVzTGluZSgpICE9IG51bGwgJiYgcmVwbH
kuZ2V0U3RhdHVzTGluZSgpLmd1dFJlc3BvbnNlQ29kZVR5cGUoKSA9PSAzKSB7CiAgICAgI
CAgICAgICBsb2MgPSByZXBseeS5nZXRIZWFkZXJzKCkuZ2V0U2V0Rmlyc3RWYWx1ZSgibG9jYXRp
b24iKTsKICAgICAgICAgICAgIGFsZXJ0KCJsb2M9PSIgKyBsb2MpOwogICAgICAgICAgICA
gaWYobG9jICE9IG51bGwgJiYgbG9jLmluZGV4T2YoImFkLmRvdWJsZWNsaWNrIikgIT0gLT
EpIHsKICAgICAgICAgICAgICAgIGlmIChsb2MuZXF1YWxzKHJ1cGx5LmdldFJ1cXV1c3QoK -continued S5nZXRVcmwoKSkpIHsKICAgICAgICAgICAgICAgICAgYWxlcnQoImVyYXNpbmcgZHVw
bG1jYXR1IGRvdWJsZWNsaWNrIHJlZG1yZWN0Iik7CiAgICAgICAgICAgICAgIHJ
lcGx5Lmd1dEh1YWR1cnMoKS5yZW1vdmUoImxvY2F0aW9uIik7CiAgICAgICAgICAgIC
AgICAgIHJ1cGx5LmdldFJ1cXV1c3QoKS5nZXRDYWxsRGF0YSgpLnNldFJ1c3BvbnN1Q29kZ
SgyMDApOwogICAgICAgICAgICAgICByZXBseS5zZXRTdGF0dXNNaW51KFBhY2th
Z2VzLmNvbS5wb3Jpdm8uaHR0cC5TdGF0dXNNaW51LmNyZWF0ZU9LU3RhdHVzTGluZSgpKTs
KICAgICAgICAgICAgIH0KICAgICAgICAgICB9CiAgICAgICB9CiAgICAgICAgfQ
p9OwoKZWwgPSBuZXcgSmF2YUFkYXB0ZXIoUGFja2FnZXMuY29tLnBvcm1 2by5odHRwLmV2Z
W50cy5IdHRwRXZ1bnRMaXN0ZW51ckJhc2UsIG9iaik7C1BhY2thZ2VzLmNvbS5wb3Jpdm8u
aHR0cC51dmVudHMuSHR0cEV2ZW50TGlzdGVuZXJTdG9yZS5nZXRJbnN0YW5jZSgpLmFkZE5
1d0xpc3R1bmVyKGVsKTs=" [809-1]
deadLine="12000000" displayName="Sign In">
[810-1:] <Configuration>
    <Param
name="http://www.gomez.com/settings/html_preparse_script"
value="dmFyIHN0ciA9IG51dyBQYWNrYWdlcy5qYXZhLmxhbmcuU3RyaW5nKGdvbWV6X3dp
bmRvd19zb3VyY2UoKSk7CnZhciBhc3MgPSAnQG1tcG9ydCB1cmwoIi9jc3MvaHBfaGFuZG2h
1bGQuY3NzNzlikgaGFuZGhlbGQ7JzsKdmFyIGlkeCA9IHN0ci5pbmRleE9mKGFzcyk7CmlmIC
hpZHggIT0gLTEpIHsKcmV0dXJuIHN0ci5yZXBsYWNlKGFzcywgJycpOwp9Bpb
XBvcnQgdXJsKCJodHRwOi8vd3d3LndhY2hvdmlhLmNvbS9S91cmwoXFwiL2Nzcy9ocF9oYW5k
aGVsZC5jc3NcIpJTIwaGFuZGhlbGQiKTsnICsgc3RyLnNlYnN0cmluZyhpZHggKyBhc3M3M
ubGVuZ3RoKTsKfQpyZXR1cm4gJycgKyBzdHI7" />
    </Configuration>
[814-1:] <ContentMatch isInclusive="false" isRegExp="true"
matchText="[Nn] [Aa] [Mm] [Ee]\s?=\s?[" ']?userid" />
[814-2:] <ContentMatch isInclusive="false" isRegExp="true"
matchText=" [Nn] [Aa] [Mm] [Ee]\s?=\s?[" '] ?password" />
[806-1:] </PageRequest>
[802-2:] <PageRequest
url="https://onlineservices.wachovia.com/auth/AuthService" method="GET"
post_script="ZG9jdW1lbnQuZm9ybXNbMV0uY29udGludWVTdWJtaXQuY2xpY2soKTs="
deadLine="120" displayName="(System Message) ">
    <Configuration>
        <Param name="http://www.gomez.com/settings/present_if_found"
value="continueSubmit" />
    </Configuration>
</PageRequest>
[802-3:] <PageRequest
url="https://onlineservices.wachovia.com/NASApp/perimeterauthentication/PerimeterServlet"
method="POST" header="User-Agent: Mozilla/4.0
(compatible; MSIE 5.01; GomezAgent 2.0; Windows NT) "
post_script="Z29tZXpfY2xpY2tMaW5rV210aFR1eHQoJ1BFU1NPTkFMJyk7"
deadLine="120" displayName="Account Summary">
    <ContentMatch isInclusive="true" isRegExp="false"
matchText="Error" />
</PageRequest>
[802-4:] <PageRequest
url="https://onlineservices.wachovia.com/onlinebanking/cgi-bin/olb.cgi"
method="POST" header="User-Agent: Mozilla/4.0 (compatible; MSIE 5.01;
GomezAgent 2.0; Windows NT) "
post_script="amF2YXNjcmlwdDpzdWJtaXRGb3JtKCdFeG10T0xCJyk7"
deadLine="120" displayName="Account Activity" >
    <ContentMatch isInclusive="true" isRegExp="false"
matchText="Error" />
</PageRequest>
[802-5:] <PageRequest
url="https://onlineservices.wachovia.com/onlinebanking/cgi-bin/olb.cgi"
method="POST" header="User-Agent: Mozilla/4.0 (compatible; MSIE 5.01;
GomezAgent 2.0; Windows NT) " deadLine="120" displayName="Log Out" />
</Transaction>

Example Script 180-1

In the above script, the numbers in square braces have been added in this document for purposes of identifying specific items in this script. As an example [802-1:] on line 3 of the script has been added and is not considered to be part of the actual script 180-1. The above example script 180-1 is shown in extensible markup language (XML) and contains several page requests that collectively define a transaction entitled "Wachovia" as shown at location 800. The first page request begins at location 802-1 and is requesting a web page at the URL http://www.wachovia.com. This particular script 180-1 is for a single transaction that includes a total of five page requests 802-1 through 802-5. Though most parts of this example script 180-1 will be explained with reference to the detailed step by step processing in flow charts below, some aspects of the content of page requests 802 will be introduced at this point to assist in understanding that later discussions.

The example first page request 802-1 in this example script 180-1 defines the URL 804-1 http://www.wachovia.com as the first page to be obtained from the web site for this transaction. This first page request ends at location 806-1 shown by the XML end element tag "</PageRequest>". Within the page request 802-1, there are several other parts defined by XML element tags.

In particular, the post script data section beginning at location 808-1 and ending at location 809-1 defines base-64 encoded JavaScript that is user script to be executed by the agent 150 to simulate user input once the page at the URL for this page request 802-1 has been fully obtain by the agent 150 from the web server 130 that serves this page. In other words, the post script data section 808-1 of page request 802-1 defines input to be provided to the page to simulate user activity of the transaction with respect to that web page of the transaction and is JavaScript that the agent 150 can interpret to provide the appropriate user input for this first page. Each page request 802 can include a post script data section 808 to simulate user input to that page if required. Such post script data user input can be used by the agent, for example, to simulate a user entering form data into form fields defined in the web page once that page has been obtained from the URL of the page request 802.

The next section of the page request 802-1 labeled with the <Configuration> XML tag at location 810-1 includes a parameter having a name http://www.gomez.com/settings/html_preparse_script followed by a encoded base-64 Javascript at location 811-1. The section 811-1 of the page request 802-1 is referred to herein as page correction data and defines modifications to be made to the web page data after retrieval to correct for page errors in the web page. The page correction data specified at location 811-1 covers a situation that may arise if HTML from the web server 130, received by the agent 150, is "broken" in that an object download incorrectly from the web page by that the object failure is not fatal to the execution of the transaction. Thus the Javascript at location 811-1 modifies the HTML in a document object model (DOM) of the HTML maintained by the agent 150 to correct for page problems.

As shown at locations 814-1 and 814-2, the page request 802-1 also includes content match sections that define expected web page data indicating data that is to be present within a web page 135 obtained form the URL of this page request 802. In this example page request 802-1, the two expected web page sections 814-1 and 814-2 indicate that a "userid" and "password" fields must be present on the web page 135 obtained from this page request 802-1. After this page request 802-1, four other page requests 802-2 through 802-5 are defined in this example script 180. Note that the page request 802-2 defines the page to be obtained upon a user clicking submit or enter after they have input their username and password. Thus, the first page request 802-1 indicates the first page of the transaction and user input 808-1 to be provided to that page, other than the actual click of the submit button that would generate the next HTTP GET request. The agent thus provides the user input 808-1 such as a username and password of a user to log into the Wachovia web site, and the next page request 802-2 encountered in the script 180 by the agent 150 causes the agent to actually issue the next HTTP GET request. Note that not all page requests 802 require user input, such as page request 802-2.

From the foregoing brief description of the content of an example script 180, a more detailed description of operation of the agent 150 can now be provided with respect to the flow chart of processing steps in FIGS. 2 through 8. During the discussion of steps and operations in these flow charts, reference will be made back to this example script 180 as well as to FIG. 1.

Figure 2:
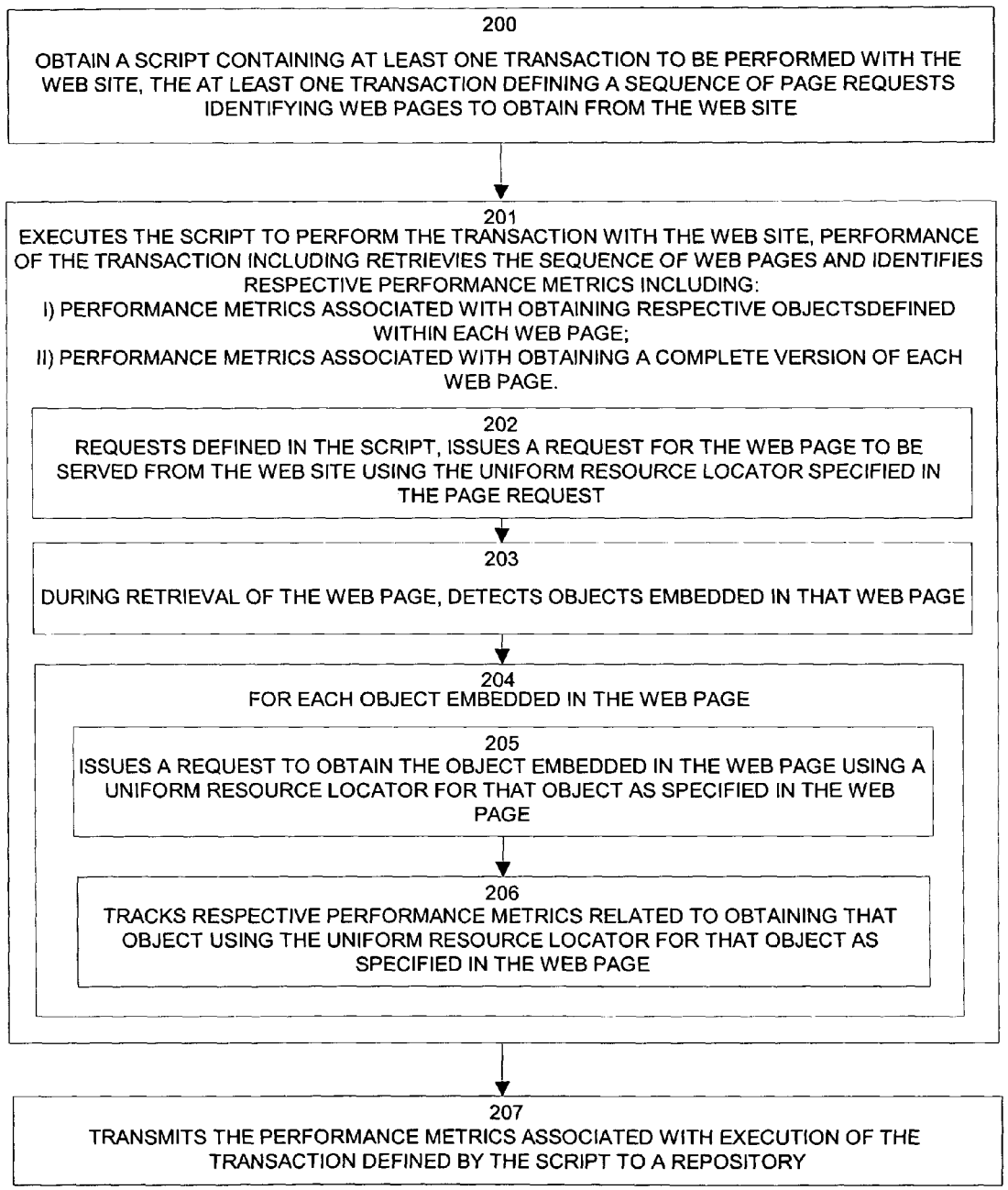
FIG. 2 is a flow chart of processing steps that shows high-level processing operations performed by an agent in accordance with one example configuration of the invention.

FIG. 2 is a flow chart of high-level processing steps performed by an agent 150 executing on an agent computer system 105 to measure performance of a web site such as may be served by any of the web servers 130. The term, web site and web server are generally interchangeable as used herein, though it is to be understood that many web sites may provide multiple web servers 130 serving web pages 135 of that site.

In step 200, the agent 150 obtains a script 180 containing at least one transaction to be performed with the web site. The transaction(s) define a sequence of page requests 802 identifying web pages 135 to obtain from the web site 130.

In step 201, the agent 150 executes (e.g., interprets, parses, etc.) the script 180 to perform the transaction with the web site. Performance of the transaction includes retrieving the sequence of web pages 135 (based on page requests 802 in the script 180) and identifying respective performance metrics 190 including i) performance metrics associated with obtaining respective objects defined within each web page 135 and ii) performance metrics associated with obtaining a complete version of each web page 135.

In step 202, for each page request 802 defined in the script 180, the agent 150 issues a request 192 (e.g., an HTTP GET request) for the web page 135 to be served from the web site using the uniform resource locator specified in the page request 802.

In step 203, during retrieval of the web page 135, the agent 150 detects objects embedded in that web page 135. An embedded object is, for example, an embedded URL within a web page 135 referencing an object such as a graphic, image, video, JavaScript, or the like.

In step 204, the agent 150 enters a processing look that is performed for each object embedded in the web page 135.

In step 205, the agent 150 issues a request 192 to obtain the object embedded in the web page 135 using a uniform resource locator for that object as specified in the web page 135.

In step 206, during retrieval of each object, the agent 150 tracks respective performance metrics 190 related to obtaining that object using the uniform resource locator for that object as specified in the web page 135. In this manner, as each object in each web page 135 is obtained, detailed performance metrics 190 for that object can be collected and stored by the agent 150. An example of such performance metrics 190 will be given shortly.

In step 207, the agent 150 transmits the performance metrics 190 associated with execution of the transaction defined by the script to a repository. In one configuration, when the transaction is complete and all pages have been downloaded, exercised with user input (as will be explained more fully later) and all performance metrics for each object, each page and the transaction as a whole are complete, the agent 150 places the performance metrics into its local database 195 for transfer back to the repository computer system 108. Thereafter, the agent command and control process 160 can post process the performance metrics 190 for analysis of web site performance and operability.

FIG. 2 is a flow chart of processing steps that shows process steps related to collection of performance metrics related to object within a web page 135. Prior to explanation of these processing steps, an second example script 180-2 containing a single page request 802-10 is shown below along with corresponding performance metrics 190 collected in response to an agent 150 executing the example script 180-2.

The second example script 180-2 is as follows:

```
<?xml version="1.0" encoding="UTF-8"?>
<Transaction name="CNN (P)" [820:] doObjectDownloads="true" [830:]
doPageSummary="false" deadLine="300">
```

```
<Configuration>
    <Param name="http://www.gomez.com/capabilities/include_meta"
value=" " />
    </Configuration>
[802-10:] <PageRequest url="http://www.cnn.com/" method="GET"
header="User-Agent: Mozilla/4.0 (compatible; MSIE 5.0; Windows NT)"
deadLine="120" />
    <PageRequest url="http://www.cnn.com/ALLPOLITICS/" method="GET"
header="User-Agent: Mozilla/4.0 (compatible; MSIE 5.0; Windows NT)"
deadLine="120" />
</Transaction>
```

Example Script 180-2

In the above script, the numbers in square braces have been added in this document for purposes of identifying specific items in this script. As an example [820:] on line 2 of the script has been added and is not considered to be part of the actual script 180-2. Notice that this script 180-2 above is short and contains only one page request 802-10 that specifies load the home page for cnn.com at http://www.cnn.com/ALLPOLITICS. Note that not user input data in the form of post script data is provided in this example script 180-2. A few other notes about this script illustrate other features of configurations disclosed herein. In particular, at line 1, a parameter in the script 180-2 is defined as "doObjectDownloads=true". This parameter indicates to the agent 150 that performance metrics at the object level for this transaction are to be collected. Another parameter called "doPageSummary=true" indicates that for each web page specified by a page request, only performance metrics concerning the overall page are to be tracked, calculated and maintained for the web page(s) specified by page requests 802 in the script, as opposed to all object level metrics. Lastly, the parameter "deadline=300" indicates that the agent is to set a timeout for completion of the transaction to be 300 seconds. Further note that in the page request 802-10 in this example script, various other parameters are specified for preparation of a proper HTTP GET request for the page located at the URL http://www.cnn.com/ALLPOLITICS. In this manner, the script allow a developer to specify intricate particulars of type of requests to be provided for web pages as well as what performance metrics are to be collected during operation of the transaction(s) defined in the script.

Example output of this script, including transaction summary performance metrics, page summary performance metrics, and object level summary performance metrics is shown below followed by a brief discussion of the performance metrics 190 output from the agent 150 for transmission to the repository computer system 108.

Below is the actual performance metrics 190 that are output from execution of the second example short script 180-2 by an agent 150—note the length and detail of the metrics even for such a short transaction illustrates the benefit of the system of the invention by showing how detailed the transaction analysis is. The output performance metrics 190 are shown below:

```xml
<?xml version="1.0" encoding="UTF-8"?>
<PutStatisticsRequest responseTime="2249" numPages="2" [856:]
numPagesSuccess="2" [857:] numPagesFailed="0" [860:] numHosts="7"
[861:] numConns="10" [858:] numObjects="127"
[859:] numObjectsFailed="0" numObjectsSuccess="127" numBytes="290083"
doPageSummary="false">
  <Host host="www.cnn.com" ip="64.236.24.28" id="0" pageId="0"
[830:] DNSStart="1120761542260" DNSTime="0" numConnections="1"
numBytes="25779" numObjects="7" numErrors="0">
    <Connection id="0" pageId="0" endPageId="1" port="80"
connectStart="1120761542260" connectTime="30" responseTime="1961"
numErrors="0" numObjects="7" numBytes="25779" />
  </Host>
  <Host host="i.cnn.net" ip="64.236.24.138" id="1" pageId="0"
DNSStart="1120761542382" DNSTime="0" numConnections="2"
numBytes="118708" numObjects="35" numErrors="0">
    <Connection id="1" pageId="0" endPageId="1" port="80"
connectStart="1120761542382" connectTime="30" responseTime="1956"
numErrors="0" numObjects="22" numBytes="100180" />
    <Connection id="7" pageId="0" endPageId="1" port="80"
connectStart="1120761542983" connectTime="31" responseTime="1416"
numErrors="0" numObjects="13" numBytes="18528" />
  </Host>
  <Host host="ar.atwola.com" ip="152.163.208.121" id="2" pageId="0"
DNSStart="1120761542746" DNSTime="0" numConnections="1"
numBytes="13402" numObjects="3" numErrors="0">
    <Connection id="2" pageId="0" endPageId="1" port="80"
connectStart="1120761542746" connectTime="20" responseTime="1443"
numErrors="0" numObjects="3" numBytes="13402" />
  </Host>
  <Host host="cnn.dyn.cnn.com" ip="64.236.29.20" id="3" pageId="0"
DNSStart="1120761542866" DNSTime="0" numConnections="2" numBytes="1887"
numObjects="2" numErrors="0">
    <Connection id="3" pageId="0" endPageId="0" port="80"
connectStart="1120761542866" connectTime="32" responseTime="133"
numErrors="0" numObjects="1" numBytes="1844" />
    <Connection id="4" pageId="0" endPageId="0" port="80"
connectStart="1120761542867" connectTime="54" responseTime="115"
numErrors="0" numObjects="1" numBytes="43" />
  </Host>
```

```
<Host host="i.a.cnn.net" ip="64.236.40.159" id="4" pageId="0"
DNSStart="1120761542868" DNSTime="0" numConnections="2"
numBytes="122121" numObjects="78" numErrors="0">
    <Connection id="5" pageId="0" endPageId="1" port="80"
connectStart="1120761542868" connectTime="27" responseTime="1613"
numErrors="0" numObjects="43" numBytes="62935" />
    <Connection id="6" pageId="0" endPageId="1" port="80"
connectStart="1120761542868" connectTime="27" responseTime="1641"
numErrors="0" numObjects="35" numBytes="59186" />
  </Host>
  <Host host="victory.cnn.com" ip="64.236.27.33" id="5" pageId="1"
DNSStart="1120761544014" DNSTime="0" numConnections="1" numBytes="306"
numObjects="1" numErrors="0">
    <Connection id="8" pageId="1" endPageId="1" port="80"
connectStart="1120761544014" connectTime="30" responseTime="75"
numErrors="0" numObjects="1" numBytes="306" />
  </Host>
  <Host host="cl.cnn.com" ip="64.236.29.11" id="6" pageId="1"
DNSStart="1120761544189" DNSTime="0" numConnections="1" numBytes="7880"
numObjects="1" numErrors="0">
    <Connection id="9" pageId="1" endPageId="1" port="80"
connectStart="1120761544189" connectTime="32" responseTime="148"
numErrors="0" numObjects="1" numBytes="7880" />
  </Host>
```

[831:] <PageSummary responseTime="1466" [852:] numHosts="5" [853:]
numConnections="8" [845:] numObjects="88" [850:] RC200Objs="88"
RC300Objs="0" RC400Objs="0" RC500Objs="0" RCNetErrObjs="0"
InternalErrObjs="0" numBytes="191549" dnsCount="5" dnsSum="0"
connectCount="8" connectSum="251" sslCount="0" sslSum="0"
firstByteCount="88" firstByteSum="2680" contentCount="88"
contentSum="589" processingTime="1506" pageID="0"
pageSummaryMode="false" timeoutStatus="0" userscriptStatus="0"
byteLimitExceeded="0">
[833:] <ObjectSummary [840:] responseCode="200"
[837:] contentType="text/html" objId="0" connectionId="0" hostId="0"
[836:] numBytes="12590" [832:] firstByteStart="1120761542290"
firstByteTime="30" contentStart="1120761542320" [834:] contentTime="62"
responseTime="92" [838:] urlHost="http://www.cnn.com"
[839:] urlPage="/" />

```
    <ObjectSummary responseCode="200" contentType="text/css" objId="2"
connectionId="1" hostId="1" numBytes="33487"
firstByteStart="1120761542412" firstByteTime="38"
contentStart="1120761542450" contentTime="95" responseTime="133"
urlHost="http://i.cnn.net"
urlPage="/cnn/.element/ssi/css/1.3/common.css" />
    <ObjectSummary responseCode="200" contentType="text/css" objId="3"
connectionId="1" hostId="1" numBytes="10632"
firstByteStart="1120761542545" firstByteTime="36"
contentStart="1120761542581" contentTime="62" responseTime="98"
urlHost="http://i.cnn.net" urlPage="/cnn/.element/ssi/css/1.3/main.css"
/>
    <ObjectSummary responseCode="200" contentType="application/x-
javascript" objId="4" connectionId="1" hostId="1" numBytes="28579"
firstByteStart="1120761542643" firstByteTime="39"
contentStart="1120761542682" contentTime="64" responseTime="103"
```

```
urlHost="http://i.cnn.net" urlPage="/cnn/.element/ssi/js/1.3/main.js"
/>
    <ObjectSummary responseCode="200" contentType="application/x-
javascript" objId="5" connectionId="2" hostId="2" numBytes="6056"
firstByteStart="1120761542766" firstByteTime="19"
contentStart="1120761542785" contentTime="59" responseTime="78"
urlHost="http://ar.atwola.com" urlPage="/file/adsWrapper.js" />
    <ObjectSummary responseCode="200" contentType="application/x-
javascript" objId="6" connectionId="2" hostId="2" numBytes="5735"
firstByteStart="1120761542844" firstByteTime="20"
contentStart="1120761542864" contentTime="2" responseTime="22"
urlHost="http://ar.atwola.com" urlPage="/file/adsPopup2.js" />
    <ObjectSummary responseCode="200" contentType="text/html"
objId="12" connectionId="0" hostId="0" numBytes="563"
firstByteStart="1120761542867" firstByteTime="37"
contentStart="1120761542904" contentTime="0" responseTime="37"
urlHost="http://www.cnn.com"
urlPage="/.element/ssi/www/breaking_news/1.1/banner.exclude.html"
urlParam="?domId=cnnBreakingNewsBanner" />
    <ObjectSummary responseCode="200" contentType="image/gif" objId="7"
connectionId="1" hostId="1" numBytes="43"
firstByteStart="1120761542868" firstByteTime="54"
contentStart="1120761542922" contentTime="0" responseTime="54"
urlHost="http://i.cnn.net" urlPage="/cnn/images/1.gif" />
    <ObjectSummary responseCode="200" contentType="image/gif" objId="8"
connectionId="5" hostId="4" numBytes="3650"
firstByteStart="1120761542895" firstByteTime="26"
contentStart="1120761542921" contentTime="1" responseTime="27"
urlHost="http://i.a.cnn.net"
urlPage="/cnn/.element/img/1.3/ceiling/logo.cnn.com.gif" />
    <ObjectSummary responseCode="200" contentType="image/gif" objId="9"
connectionId="6" hostId="4" numBytes="1556"
firstByteStart="1120761542895" firstByteTime="27"
contentStart="1120761542922" contentTime="1" responseTime="28"
urlHost="http://i.a.cnn.net"
urlPage="/cnn/.element/img/1.3/nshat/white/ns.logo.standalone.gif" />
    <ObjectSummary responseCode="200" contentType="text/html"
objId="78" connectionId="3" hostId="3" numBytes="1844"
firstByteStart="1120761542898" firstByteTime="71"
contentStart="1120761542969" contentTime="30" responseTime="101"
urlHost="http://cnn.dyn.cnn.com" urlPage="/weatherBox.html"
urlParam="?domId=weatherBox&time=1120761544174" />
    <ObjectSummary responseCode="200" contentType="image/gif"
objId="88" connectionId="4" hostId="3" numBytes="43"
firstByteStart="1120761542921" firstByteTime="43"
contentStart="1120761542964" contentTime="18" responseTime="61"
urlHost="http://cnn.dyn.cnn.com" urlPage="/cookie.crumb" />
    <ObjectSummary responseCode="200" contentType="image/gif"
objId="10" connectionId="5" hostId="4" numBytes="2075"
firstByteStart="1120761542922" firstByteTime="24"
contentStart="1120761542946" contentTime="0" responseTime="24"
urlHost="http://i.a.cnn.net"
urlPage="/cnn/.element/img/1.3/ceiling/homepage.btn.gif" />
    <ObjectSummary responseCode="200" contentType="image/gif"
objId="20" connectionId="1" hostId="1" numBytes="1131"
firstByteStart="1120761542922" firstByteTime="53"
contentStart="1120761542975" contentTime="1" responseTime="54"
```

```
urlHost="http://i.cnn.net"
urlPage="/cnn/.element/img/1.3/nav/nav.red.gif" />
    <ObjectSummary responseCode="200" contentType="image/gif"
objId="11" connectionId="6" hostId="4" numBytes="311"
firstByteStart="1120761542923" firstByteTime="33"
contentStart="1120761542956" contentTime="64" responseTime="97"
urlHost="http://i.a.cnn.net"
urlPage="/cnn/.element/img/1.3/ceiling/wrapper.bg.gif" />
    <ObjectSummary responseCode="200" contentType="image/gif"
objId="13" connectionId="5" hostId="4" numBytes="155"
firstByteStart="1120761542946" firstByteTime="30"
contentStart="1120761542976" contentTime="0" responseTime="30"
urlHost="http://i.a.cnn.net"
urlPage="/cnn/.element/img/1.3/searchbar/bg.gif" />
    <ObjectSummary responseCode="200" contentType="image/gif"
objId="14" connectionId="5" hostId="4" numBytes="385"
firstByteStart="1120761542976" firstByteTime="21"
contentStart="1120761542997" contentTime="0" responseTime="21"
urlHost="http://i.a.cnn.net"
urlPage="/cnn/.element/img/1.3/searchbar/nav.gradient.gif" />
    <ObjectSummary responseCode="200" contentType="image/gif"
objId="21" connectionId="1" hostId="1" numBytes="1069"
firstByteStart="1120761542976" firstByteTime="35"
contentStart="1120761543011" contentTime="0" responseTime="35"
urlHost="http://i.cnn.net"
urlPage="/cnn/.element/img/1.3/nav/nav.blue.gif" />
    <ObjectSummary responseCode="200" contentType="image/gif"
objId="15" connectionId="5" hostId="4" numBytes="1420"
firstByteStart="1120761542997" firstByteTime="23"
contentStart="1120761543020" contentTime="0" responseTime="23"
urlHost="http://i.a.cnn.net"
urlPage="/cnn/.element/img/1.3/searchbar/hdr.gif" />
    <ObjectSummary responseCode="200" contentType="image/gif"
objId="23" connectionId="1" hostId="1" numBytes="996"
firstByteStart="1120761543012" firstByteTime="34"
contentStart="1120761543046" contentTime="1" responseTime="35"
urlHost="http://i.cnn.net"
urlPage="/cnn/.element/img/1.3/nav/nav.si.off.gif" />
    <ObjectSummary responseCode="200" contentType="image/gif"
objId="22" connectionId="7" hostId="1" numBytes="1081"
firstByteStart="1120761543014" firstByteTime="44"
contentStart="1120761543058" contentTime="0" responseTime="44"
urlHost="http://i.cnn.net"
urlPage="/cnn/.element/img/1.3/nav/navmoney.off.gif" />
    <ObjectSummary responseCode="200" contentType="image/gif"
objId="16" connectionId="6" hostId="4" numBytes="280"
firstByteStart="1120761543020" firstByteTime="20"
contentStart="1120761543040" contentTime="0" responseTime="20"
urlHost="http://i.a.cnn.net"
urlPage="/cnn/.element/img/1.3/searchbar/vert.divider.gif" />
    <ObjectSummary responseCode="200" contentType="image/gif"
objId="17" connectionId="5" hostId="4" numBytes="228"
firstByteStart="1120761543021" firstByteTime="21"
contentStart="1120761543042" contentTime="0" responseTime="21"
urlHost="http://i.a.cnn.net"
urlPage="/cnn/.element/img/1.3/searchbar/the.web.gif" />
```

```
    <ObjectSummary responseCode="200" contentType="image/gif"
objId="18" connectionId="6" hostId="4" numBytes="278"
firstByteStart="1120761543040" firstByteTime="27"
contentStart="1120761543067" contentTime="0" responseTime="27"
urlHost="http://i.a.cnn.net"
urlPage="/cnn/.element/img/1.3/searchbar/cnn.com.gif" />
    <ObjectSummary responseCode="200" contentType="image/gif"
objId="19" connectionId="5" hostId="4" numBytes="1898"
firstByteStart="1120761543042" firstByteTime="25"
contentStart="1120761543067" contentTime="0" responseTime="25"
urlHost="http://i.a.cnn.net"
urlPage="/cnn/.element/img/1.3/searchbar/yahoo.logo.gif" />
    <ObjectSummary responseCode="200" contentType="image/gif"
objId="24" connectionId="1" hostId="1" numBytes="198"
firstByteStart="1120761543047" firstByteTime="35"
contentStart="1120761543082" contentTime="0" responseTime="35"
urlHost="http://i.cnn.net"
urlPage="/cnn/.element/img/1.3/nav/icon.now.free.gif" />
    <ObjectSummary responseCode="200" contentType="image/gif"
objId="25" connectionId="7" hostId="1" numBytes="682"
firstByteStart="1120761543058" firstByteTime="41"
contentStart="1120761543099" contentTime="0" responseTime="41"
urlHost="http://i.cnn.net"
urlPage="/cnn/.element/img/1.3/nav/nav.autos.off.gif" />
    <ObjectSummary responseCode="200" contentType="image/gif"
objId="26" connectionId="5" hostId="4" numBytes="2421"
firstByteStart="1120761543067" firstByteTime="28"
contentStart="1120761543095" contentTime="0" responseTime="28"
urlHost="http://i.a.cnn.net"
urlPage="/cnn/.element/img/1.3/nav/hdr.services.gif" />
    <ObjectSummary responseCode="200" contentType="image/gif"
objId="27" connectionId="6" hostId="4" numBytes="102"
firstByteStart="1120761543070" firstByteTime="28"
contentStart="1120761543098" contentTime="0" responseTime="28"
urlHost="http://i.a.cnn.net"
urlPage="/cnn/.element/img/1.3/nav/gray.bg.gif" />
    <ObjectSummary responseCode="200" contentType="image/gif"
objId="30" connectionId="1" hostId="1" numBytes="133"
firstByteStart="1120761543082" firstByteTime="35"
contentStart="1120761543117" contentTime="0" responseTime="35"
urlHost="http://i.cnn.net"
urlPage="/cnn/.element/img/1.3/nav/xml.icon.navbar.2.gif" />
    <ObjectSummary responseCode="200" contentType="image/gif"
objId="28" connectionId="5" hostId="4" numBytes="192"
firstByteStart="1120761543095" firstByteTime="30"
contentStart="1120761543125" contentTime="0" responseTime="30"
urlHost="http://i.a.cnn.net"
urlPage="/cnn/.element/img/1.3/nav/gray.top.gif" />
    <ObjectSummary responseCode="200" contentType="image/gif"
objId="29" connectionId="6" hostId="4" numBytes="349"
firstByteStart="1120761543098" firstByteTime="33"
contentStart="1120761543131" contentTime="0" responseTime="33"
urlHost="http://i.a.cnn.net"
urlPage="/cnn/.element/img/1.3/nav/gray.div.gif" />
    <ObjectSummary responseCode="200" contentType="image/gif"
objId="36" connectionId="7" hostId="1" numBytes="3097"
firstByteStart="1120761543099" firstByteTime="39"
```

```
contentStart="1120761543138" contentTime="32" responseTime="71"
urlHost="http://i.cnn.net"
urlPage="/cnn/.element/img/1.3/video/video.bg.right.gif" />
    <ObjectSummary responseCode="200" contentType="image/jpeg"
objId="37" connectionId="1" hostId="1" numBytes="4501"
firstByteStart="1120761543117" firstByteTime="36"
contentStart="1120761543153" contentTime="31" responseTime="67"
urlHost="http://i.cnn.net"
urlPage="/cnn/video/world/2005/07/07/tic.vs.affl.jpg" />
    <ObjectSummary responseCode="200" contentType="image/gif"
objId="31" connectionId="5" hostId="4" numBytes="130"
firstByteStart="1120761543125" firstByteTime="21"
contentStart="1120761543146" contentTime="0" responseTime="21"
urlHost="http://i.a.cnn.net"
urlPage="/cnn/.element/img/1.3/nav/gray.bot.gif" />
    <ObjectSummary responseCode="200" contentType="image/jpeg"
objId="32" connectionId="6" hostId="4" numBytes="16270"
firstByteStart="1120761543131" firstByteTime="23"
contentStart="1120761543154" contentTime="43" responseTime="66"
urlHost="http://i.a.cnn.net"
urlPage="/cnn/2005/WORLD/europe/07/07/london.tube/top.ambulance.ap.jpg"
/>
    <ObjectSummary responseCode="200" contentType="image/gif"
objId="33" connectionId="5" hostId="4" numBytes="46"
firstByteStart="1120761543147" firstByteTime="23"
contentStart="1120761543170" contentTime="0" responseTime="23"
urlHost="http://i.a.cnn.net"
urlPage="/cnn/.element/img/1.3/misc/arrow.blue.gif" />
    <ObjectSummary responseCode="200" contentType="image/gif"
objId="34" connectionId="5" hostId="4" numBytes="97"
firstByteStart="1120761543170" firstByteTime="28"
contentStart="1120761543198" contentTime="1" responseTime="29"
urlHost="http://i.a.cnn.net"
urlPage="/cnn/.element/img/1.3/misc/icon.offsite.gif" />
    <ObjectSummary responseCode="200" contentType="image/jpeg"
objId="38" connectionId="7" hostId="1" numBytes="1325"
firstByteStart="1120761543170" firstByteTime="48"
contentStart="1120761543218" contentTime="0" responseTime="48"
urlHost="http://i.cnn.net"
urlPage="/cnn/video/us/2005/07/07/news.chertoff.vs.cnn.jpg" />
    <ObjectSummary responseCode="200" contentType="image/jpeg"
objId="35" connectionId="6" hostId="4" numBytes="3046"
firstByteStart="1120761543197" firstByteTime="26"
contentStart="1120761543223" contentTime="1" responseTime="27"
urlHost="http://i.a.cnn.net"
urlPage="/cnn/2005/images/05/23/tz.hurricane.jpg" />
    <ObjectSummary responseCode="200" contentType="image/gif"
objId="39" connectionId="1" hostId="1" numBytes="43"
firstByteStart="1120761543198" firstByteTime="37"
contentStart="1120761543235" contentTime="2" responseTime="39"
urlHost="http://i.cnn.net"
urlPage="/cnn/.element/img/1.3/misc/dddddd.px.gif" />
    <ObjectSummary responseCode="200" contentType="image/gif"
objId="48" connectionId="5" hostId="4" numBytes="88"
firstByteStart="1120761543199" firstByteTime="26"
contentStart="1120761543225" contentTime="0" responseTime="26"
```

```
urlHost="http://i.a.cnn.net"
urlPage="/cnn/.element/img/1.3/main/arrow.down.gif" />
    <ObjectSummary responseCode="200" contentType="image/gif"
objId="40" connectionId="7" hostId="1" numBytes="721"
firstByteStart="1120761543218" firstByteTime="35"
contentStart="1120761543253" contentTime="0" responseTime="35"
urlHost="http://i.cnn.net"
urlPage="/cnn/.element/img/1.3/video/tab.left.on.gif" />
    <ObjectSummary responseCode="200" contentType="image/gif"
objId="49" connectionId="6" hostId="4" numBytes="88"
firstByteStart="1120761543224" firstByteTime="25"
contentStart="1120761543249" contentTime="0" responseTime="25"
urlHost="http://i.a.cnn.net"
urlPage="/cnn/.element/img/1.3/main/arrow.up.gif" />
    <ObjectSummary responseCode="200" contentType="image/gif"
objId="51" connectionId="5" hostId="4" numBytes="3365"
firstByteStart="1120761543225" firstByteTime="27"
contentStart="1120761543252" contentTime="0" responseTime="27"
urlHost="http://i.a.cnn.net"
urlPage="/cnn/.element/img/1.3/main/ftn/free.video.gif" />
    <ObjectSummary responseCode="200" contentType="image/gif"
objId="41" connectionId="1" hostId="1" numBytes="150"
firstByteStart="1120761543237" firstByteTime="35"
contentStart="1120761543272" contentTime="0" responseTime="35"
urlHost="http://i.cnn.net"
urlPage="/cnn/.element/img/1.3/video/tab.bg.on.gif" />
    <ObjectSummary responseCode="200" contentType="image/gif"
objId="52" connectionId="6" hostId="4" numBytes="172"
firstByteStart="1120761543251" firstByteTime="21"
contentStart="1120761543272" contentTime="0" responseTime="21"
urlHost="http://i.a.cnn.net"
urlPage="/cnn/.element/img/1.3/main/fb.top.gif" />
    <ObjectSummary responseCode="200" contentType="image/jpeg"
objId="54" connectionId="5" hostId="4" numBytes="2577"
firstByteStart="1120761543253" firstByteTime="27"
contentStart="1120761543280" contentTime="0" responseTime="27"
urlHost="http://i.a.cnn.net"
urlPage="/cnn/2005/images/07/07/tz.dancing.4.jpg" />
    <ObjectSummary responseCode="200" contentType="image/gif"
objId="42" connectionId="7" hostId="1" numBytes="1448"
firstByteStart="1120761543253" firstByteTime="38"
contentStart="1120761543291" contentTime="1" responseTime="39"
urlHost="http://i.cnn.net"
urlPage="/cnn/.element/img/1.3/video/tab.middle.on.gif" />
    <ObjectSummary responseCode="200" contentType="image/jpeg"
objId="55" connectionId="6" hostId="4" numBytes="2171"
firstByteStart="1120761543272" firstByteTime="27"
contentStart="1120761543299" contentTime="0" responseTime="27"
urlHost="http://i.a.cnn.net"
urlPage="/cnn/2005/images/07/06/tz.live8.3.jpg" />
    <ObjectSummary responseCode="200" contentType="image/gif"
objId="43" connectionId="1" hostId="1" numBytes="152"
firstByteStart="1120761543272" firstByteTime="42"
contentStart="1120761543314" contentTime="0" responseTime="42"
urlHost="http://i.cnn.net"
urlPage="/cnn/.element/img/1.3/video/tab.bg.off.gif" />
```

```
    <ObjectSummary responseCode="200" contentType="image/gif"
objId="56" connectionId="5" hostId="4" numBytes="173"
firstByteStart="1120761543280" firstByteTime="26"
contentStart="1120761543306" contentTime="0" responseTime="26"
urlHost="http://i.a.cnn.net"
urlPage="/cnn/.element/img/1.3/main/fb.bottom.gif" />
    <ObjectSummary responseCode="200" contentType="image/gif"
objId="44" connectionId="7" hostId="1" numBytes="748"
firstByteStart="1120761543292" firstByteTime="39"
contentStart="1120761543331" contentTime="0" responseTime="39"
urlHost="http://i.cnn.net"
urlPage="/cnn/.element/img/1.3/video/tab.right.off.gif" />
    <ObjectSummary responseCode="200" contentType="image/gif"
objId="57" connectionId="6" hostId="4" numBytes="342"
firstByteStart="1120761543299" firstByteTime="26"
contentStart="1120761543325" contentTime="0" responseTime="26"
urlHost="http://i.a.cnn.net"
urlPage="/cnn/.element/img/1.3/misc/hdr.blk.us.gif" />
    <ObjectSummary responseCode="200" contentType="image/gif"
objId="58" connectionId="5" hostId="4" numBytes="78"
firstByteStart="1120761543307" firstByteTime="24"
contentStart="1120761543331" contentTime="0" responseTime="24"
urlHost="http://i.a.cnn.net"
urlPage="/cnn/.element/img/1.3/misc/section.gray.gradient3.gif" />
    <ObjectSummary responseCode="200" contentType="image/gif"
objId="45" connectionId="1" hostId="1" numBytes="750"
firstByteStart="1120761543314" firstByteTime="36"
contentStart="1120761543350" contentTime="0" responseTime="36"
urlHost="http://i.cnn.net"
urlPage="/cnn/.element/img/1.3/video/tab.left.off.gif" />
    <ObjectSummary responseCode="200" contentType="image/gif"
objId="59" connectionId="6" hostId="4" numBytes="153"
firstByteStart="1120761543325" firstByteTime="26"
contentStart="1120761543351" contentTime="0" responseTime="26"
urlHost="http://i.a.cnn.net"
urlPage="/cnn/.element/img/1.3/misc/bbin.vert.div.gif" />
    <ObjectSummary responseCode="200" contentType="image/gif"
objId="60" connectionId="5" hostId="4" numBytes="99"
firstByteStart="1120761543331" firstByteTime="21"
contentStart="1120761543352" contentTime="1" responseTime="22"
urlHost="http://i.a.cnn.net"
urlPage="/cnn/.element/img/1.3/misc/bbin.gray.arrow.gif" />
    <ObjectSummary responseCode="200" contentType="image/gif"
objId="46" connectionId="7" hostId="1" numBytes="1425"
firstByteStart="1120761543331" firstByteTime="37"
contentStart="1120761543368" contentTime="0" responseTime="37"
urlHost="http://i.cnn.net"
urlPage="/cnn/.element/img/1.3/video/tab.middle.off.gif" />
    <ObjectSummary responseCode="200" contentType="image/gif"
objId="61" connectionId="6" hostId="4" numBytes="499"
firstByteStart="1120761543351" firstByteTime="22"
contentStart="1120761543373" contentTime="0" responseTime="22"
urlHost="http://i.a.cnn.net"
urlPage="/cnn/.element/img/1.3/misc/hdr.blk.world.gif" />
    <ObjectSummary responseCode="200" contentType="image/gif"
objId="47" connectionId="1" hostId="1" numBytes="1155"
firstByteStart="1120761543351" firstByteTime="36"
```

```
contentStart="1120761543387" contentTime="0" responseTime="36"
urlHost="http://i.cnn.net"
urlPage="/cnn/.element/img/1.3/video/tab.right.on.gif" />
    <ObjectSummary responseCode="200" contentType="image/gif"
objId="62" connectionId="5" hostId="4" numBytes="523"
firstByteStart="1120761543353" firstByteTime="23"
contentStart="1120761543376" contentTime="1" responseTime="24"
urlHost="http://i.a.cnn.net"
urlPage="/cnn/.element/img/1.3/misc/hdr.blk.tech.gif" />
    <ObjectSummary responseCode="200" contentType="image/gif"
objId="50" connectionId="7" hostId="1" numBytes="138"
firstByteStart="1120761543369" firstByteTime="38"
contentStart="1120761543407" contentTime="0" responseTime="38"
urlHost="http://i.cnn.net" urlPage="/cnn/.element/img/1.0/misc/bc-logo-
transparent.gif" />
    <ObjectSummary responseCode="200" contentType="image/gif"
objId="63" connectionId="6" hostId="4" numBytes="576"
firstByteStart="1120761543373" firstByteTime="32"
contentStart="1120761543405" contentTime="0" responseTime="32"
urlHost="http://i.a.cnn.net"
urlPage="/cnn/.element/img/1.3/misc/hdr.blk.entertainment.gif" />
    <ObjectSummary responseCode="200" contentType="image/gif"
objId="64" connectionId="5" hostId="4" numBytes="414"
firstByteStart="1120761543377" firstByteTime="27"
contentStart="1120761543404" contentTime="0" responseTime="27"
urlHost="http://i.a.cnn.net"
urlPage="/cnn/.element/img/1.3/misc/hdr.blk.politics.gif" />
    <ObjectSummary responseCode="200" contentType="image/gif"
objId="53" connectionId="1" hostId="1" numBytes="857"
firstByteStart="1120761543387" firstByteTime="35"
contentStart="1120761543422" contentTime="0" responseTime="35"
urlHost="http://i.cnn.net"
urlPage="/cnn/.element/img/1.3/main/fb.generic.gif" />
    <ObjectSummary responseCode="200" contentType="image/gif"
objId="65" connectionId="5" hostId="4" numBytes="309"
firstByteStart="1120761543404" firstByteTime="22"
contentStart="1120761543426" contentTime="0" responseTime="22"
urlHost="http://i.a.cnn.net"
urlPage="/cnn/.element/img/1.3/misc/hdr.blk.law.gif" />
    <ObjectSummary responseCode="200" contentType="image/gif"
objId="66" connectionId="6" hostId="4" numBytes="425"
firstByteStart="1120761543406" firstByteTime="25"
contentStart="1120761543431" contentTime="0" responseTime="25"
urlHost="http://i.a.cnn.net"
urlPage="/cnn/.element/img/1.3/misc/hdr.blk.health.gif" />
    <ObjectSummary responseCode="200" contentType="image/gif"
objId="67" connectionId="5" hostId="4" numBytes="711"
firstByteStart="1120761543426" firstByteTime="22"
contentStart="1120761543448" contentTime="0" responseTime="22"
urlHost="http://i.a.cnn.net"
urlPage="/cnn/.element/img/1.3/misc/hdr.blk.science.gif" />
    <ObjectSummary responseCode="200" contentType="image/gif"
objId="68" connectionId="6" hostId="4" numBytes="437"
firstByteStart="1120761543432" firstByteTime="20"
contentStart="1120761543452" contentTime="0" responseTime="20"
urlHost="http://i.a.cnn.net"
urlPage="/cnn/.element/img/1.3/misc/hdr.blk.travel.gif" />
```

```xml
<ObjectSummary responseCode="200" contentType="image/gif"
objId="69" connectionId="5" hostId="4" numBytes="497"
firstByteStart="1120761543448" firstByteTime="21"
contentStart="1120761543469" contentTime="0" responseTime="21"
urlHost="http://i.a.cnn.net"
urlPage="/cnn/.element/img/1.3/misc/hdr.blk.education.gif" />
<ObjectSummary responseCode="200" contentType="image/gif"
objId="70" connectionId="6" hostId="4" numBytes="433"
firstByteStart="1120761543453" firstByteTime="22"
contentStart="1120761543475" contentTime="1" responseTime="23"
urlHost="http://i.a.cnn.net"
urlPage="/cnn/.element/img/1.3/misc/hdr.blk.sports.gif" />
<ObjectSummary responseCode="200" contentType="image/gif"
objId="71" connectionId="5" hostId="4" numBytes="490"
firstByteStart="1120761543469" firstByteTime="22"
contentStart="1120761543491" contentTime="1" responseTime="23"
urlHost="http://i.a.cnn.net"
urlPage="/cnn/.element/img/1.3/misc/hdr.blk.business.gif" />
<ObjectSummary responseCode="200" contentType="image/gif"
objId="72" connectionId="6" hostId="4" numBytes="1811"
firstByteStart="1120761543476" firstByteTime="25"
contentStart="1120761543501" contentTime="0" responseTime="25"
urlHost="http://i.a.cnn.net"
urlPage="/cnn/.element/img/1.3/main/travelot.ad.gif" />
<ObjectSummary responseCode="200" contentType="image/gif"
objId="73" connectionId="5" hostId="4" numBytes="1180"
firstByteStart="1120761543492" firstByteTime="22"
contentStart="1120761543514" contentTime="0" responseTime="22"
urlHost="http://i.a.cnn.net"
urlPage="/cnn/.element/img/1.1/main/travelot/logo_generic_red.gif" />
<ObjectSummary responseCode="200" contentType="image/jpeg"
objId="74" connectionId="6" hostId="4" numBytes="2186"
firstByteStart="1120761543502" firstByteTime="26"
contentStart="1120761543528" contentTime="0" responseTime="26"
urlHost="http://i.a.cnn.net"
urlPage="/cnn/2005/images/07/04/tz.jessica.cnn.jpg" />
<ObjectSummary responseCode="200" contentType="image/jpeg"
objId="75" connectionId="5" hostId="4" numBytes="3069"
firstByteStart="1120761543514" firstByteTime="22"
contentStart="1120761543536" contentTime="1" responseTime="23"
urlHost="http://i.a.cnn.net"
urlPage="/cnn/2005/images/07/06/tz.iran.posters.jpg" />
<ObjectSummary responseCode="200" contentType="image/gif"
objId="76" connectionId="6" hostId="4" numBytes="3624"
firstByteStart="1120761543528" firstByteTime="31"
contentStart="1120761543559" contentTime="1" responseTime="32"
urlHost="http://i.a.cnn.net"
urlPage="/cnn/2005/TRAVEL/DESTINATIONS/05/19/72.holes.chicago/tz.golf.gif" />
<ObjectSummary responseCode="200" contentType="image/gif"
objId="77" connectionId="5" hostId="4" numBytes="3044"
firstByteStart="1120761543537" firstByteTime="25"
contentStart="1120761543562" contentTime="0" responseTime="25"
urlHost="http://i.a.cnn.net"
urlPage="/cnn/.element/img/1.3/misc/hdr.weather.gif" />
<ObjectSummary responseCode="200" contentType="image/gif"
objId="79" connectionId="6" hostId="4" numBytes="1000"
```

```
firstByteStart="1120761543560" firstByteTime="43"
contentStart="1120761543603" contentTime="11" responseTime="54"
urlHost="http://i.a.cnn.net"
urlPage="/cnn/.element/img/1.3/misc/hdr.quickvote.gif" />
    <ObjectSummary responseCode="200" contentType="image/gif"
objId="80" connectionId="5" hostId="4" numBytes="709"
firstByteStart="1120761543563" firstByteTime="39"
contentStart="1120761543602" contentTime="0" responseTime="39"
urlHost="http://i.a.cnn.net"
urlPage="/cnn/.element/img/1.0/main/partner_ew.gif" />
    <ObjectSummary responseCode="200" contentType="image/gif"
objId="81" connectionId="5" hostId="4" numBytes="1020"
firstByteStart="1120761543603" firstByteTime="25"
contentStart="1120761543628" contentTime="0" responseTime="25"
urlHost="http://i.a.cnn.net"
urlPage="/cnn/.element/img/1.3/main/partner.sicom.gif" />
    <ObjectSummary responseCode="200" contentType="image/gif"
objId="82" connectionId="6" hostId="4" numBytes="439"
firstByteStart="1120761543615" firstByteTime="23"
contentStart="1120761543638" contentTime="0" responseTime="23"
urlHost="http://i.a.cnn.net"
urlPage="/cnn/.element/img/1.0/main/partner_time.gif" />
    <ObjectSummary responseCode="200" contentType="image/gif"
objId="83" connectionId="5" hostId="4" numBytes="169"
firstByteStart="1120761543628" firstByteTime="32"
contentStart="1120761543660" contentTime="1" responseTime="33"
urlHost="http://i.a.cnn.net"
urlPage="/cnn/.element/img/1.3/searchbar/vert.divider.floor.gif" />
    <ObjectSummary responseCode="200" contentType="image/gif"
objId="84" connectionId="6" hostId="4" numBytes="52"
firstByteStart="1120761543638" firstByteTime="33"
contentStart="1120761543671" contentTime="0" responseTime="33"
urlHost="http://i.a.cnn.net"
urlPage="/cnn/.element/img/1.3/floor/dots.gif" />
    <ObjectSummary responseCode="200" contentType="image/gif"
objId="85" connectionId="5" hostId="4" numBytes="135"
firstByteStart="1120761543661" firstByteTime="33"
contentStart="1120761543694" contentTime="0" responseTime="33"
urlHost="http://i.a.cnn.net"
urlPage="/cnn/.element/img/1.3/floor/offsite.gif" />
    <ObjectSummary responseCode="200" contentType="image/gif"
objId="86" connectionId="6" hostId="4" numBytes="273"
firstByteStart="1120761543671" firstByteTime="24"
contentStart="1120761543695" contentTime="0" responseTime="24"
urlHost="http://i.a.cnn.net"
urlPage="/cnn/.element/img/1.3/floor/xml.gif" />
    <ObjectSummary responseCode="200" contentType="image/gif"
objId="87" connectionId="5" hostId="4" numBytes="1957"
firstByteStart="1120761543695" firstByteTime="31"
contentStart="1120761543726" contentTime="0" responseTime="31"
urlHost="http://i.a.cnn.net"
urlPage="/cnn/.element/img/1.3/main/novell.gif" />
  </PageSummary>
  <PageSummary responseTime="783" numHosts="6" numConnections="8"
numObjects="39" RC200Objs="39" RC300Objs="0" RC400Objs="0"
RC500Objs="0" RCNetErrObjs="0" InternalErrObjs="0" numBytes="98534"
dnsCount="2" dnsSum="0" connectCount="2" connectSum="62" sslCount="0"
```

```xml
sslSum="0" firstByteCount="39" firstByteSum="1242" contentCount="39"
contentSum="343" processingTime="1124" pageID="1"
pageSummaryMode="false" timeoutStatus="0" userscriptStatus="0"
byteLimitExceeded="0">
    <ObjectSummary responseCode="200" contentType="text/html" objId="1"
connectionId="0" hostId="0" numBytes="123"
firstByteStart="1120761543726" firstByteTime="30"
contentStart="1120761543756" contentTime="0" responseTime="30"
urlHost="http://www.cnn.com" urlPage="/ALLPOLITICS/" />
    <ObjectSummary responseCode="200" contentType="text/html"
objId="89" connectionId="0" hostId="0" numBytes="8643"
firstByteStart="1120761543756" firstByteTime="30"
contentStart="1120761543786" contentTime="62" responseTime="92"
urlHost="http://www.cnn.com" urlPage="/POLITICS/" />
    <ObjectSummary responseCode="200" contentType="text/css" objId="91"
connectionId="1" hostId="1" numBytes="14021"
firstByteStart="1120761543848" firstByteTime="38"
contentStart="1120761543886" contentTime="61" responseTime="99"
urlHost="http://i.cnn.net" urlPage="/cnn/.element/ssi/css/1.3/sect.css"
/>
    <ObjectSummary responseCode="200" contentType="text/html"
objId="93" connectionId="0" hostId="0" numBytes="3248"
firstByteStart="1120761543947" firstByteTime="37"
contentStart="1120761543984" contentTime="30" responseTime="67"
urlHost="http://www.cnn.com"
urlPage="/virtual/editions/europe/2000/roof/change.pop/frameset.exclude
.html" />
    <ObjectSummary responseCode="200" contentType="text/html"
objId="95" connectionId="8" hostId="5" numBytes="306"
firstByteStart="1120761544044" firstByteTime="37"
contentStart="1120761544081" contentTime="8" responseTime="45"
urlHost="http://victory.cnn.com" urlPage="/continent.js" />
    <ObjectSummary responseCode="200" contentType="image/gif"
objId="97" connectionId="5" hostId="4" numBytes="7309"
firstByteStart="1120761544089" firstByteTime="21"
contentStart="1120761544110" contentTime="20" responseTime="41"
urlHost="http://i.a.cnn.net"
urlPage="/cnn/.element/img/1.1/misc/choose.edition/bg.gif" />
    <ObjectSummary responseCode="200" contentType="image/gif"
objId="98" connectionId="6" hostId="4" numBytes="265"
firstByteStart="1120761544094" firstByteTime="23"
contentStart="1120761544117" contentTime="0" responseTime="23"
urlHost="http://i.a.cnn.net"
urlPage="/cnn/.element/img/1.1/misc/choose.edition/SetBtn.gif" />
    <ObjectSummary responseCode="200" contentType="image/gif"
objId="99" connectionId="1" hostId="1" numBytes="43"
firstByteStart="1120761544094" firstByteTime="36"
contentStart="1120761544130" contentTime="1" responseTime="37"
urlHost="http://i.cnn.net" urlPage="/cnn/1.gif" />
    <ObjectSummary responseCode="200" contentType="image/gif"
objId="100" connectionId="0" hostId="0" numBytes="49"
firstByteStart="1120761544131" firstByteTime="32"
contentStart="1120761544163" contentTime="0" responseTime="32"
urlHost="http://www.cnn.com" urlPage="/images/ep_track.gif"
urlParam="?partner=editionselect&path=/www" />
    <ObjectSummary responseCode="200" contentType="application/x-
javascript" objId="102" connectionId="2" hostId="2" numBytes="1611"
```

```
firstByteStart="1120761544163" firstByteTime="26"
contentStart="1120761544189" contentTime="0" responseTime="26"
urlHost="http://ar.atwola.com" urlPage="/file/adsEnd.js" />
    <ObjectSummary responseCode="200" contentType="image/gif"
objId="129" connectionId="6" hostId="4" numBytes="102"
firstByteStart="1120761544190" firstByteTime="23"
contentStart="1120761544213" contentTime="1" responseTime="24"
urlHost="http://i.a.cnn.net"
urlPage="/cnn/.element/img/1.3/nav/search.bg.gif" />
    <ObjectSummary responseCode="200" contentType="image/gif"
objId="128" connectionId="5" hostId="4" numBytes="2469"
firstByteStart="1120761544190" firstByteTime="24"
contentStart="1120761544214" contentTime="1" responseTime="25"
urlHost="http://i.a.cnn.net"
urlPage="/cnn/.element/img/1.3/nav/search.hdr.gif" />
    <ObjectSummary responseCode="200" contentType="image/gif"
objId="136" connectionId="1" hostId="1" numBytes="97"
firstByteStart="1120761544190" firstByteTime="37"
contentStart="1120761544227" contentTime="0" responseTime="37"
urlHost="http://i.cnn.net"
urlPage="/cnn/.element/img/1.3/misc/icon.offsite.gif" />
    <ObjectSummary responseCode="200" contentType="text/html"
objId="108" connectionId="0" hostId="0" numBytes="563"
firstByteStart="1120761544190" firstByteTime="31"
contentStart="1120761544221" contentTime="0" responseTime="31"
urlHost="http://www.cnn.com"
urlPage="/.element/ssi/www/breaking_news/1.1/banner.exclude.html"
urlParam="?domId=cnnBreakingNewsBanner" />
    <ObjectSummary responseCode="200" contentType="image/jpeg"
objId="140" connectionId="7" hostId="1" numBytes="2596"
firstByteStart="1120761544191" firstByteTime="41"
contentStart="1120761544232" contentTime="1" responseTime="42"
urlHost="http://i.cnn.net"
urlPage="/cnn/video/politics/2005/07/07/pataki.vs.cnn.jpg" />
    <ObjectSummary responseCode="200" contentType="image/gif"
objId="130" connectionId="6" hostId="4" numBytes="173"
firstByteStart="1120761544214" firstByteTime="24"
contentStart="1120761544238" contentTime="1" responseTime="25"
urlHost="http://i.a.cnn.net"
urlPage="/cnn/.element/img/1.3/searchbar/web.gif" />
    <ObjectSummary responseCode="200" contentType="image/gif"
objId="131" connectionId="5" hostId="4" numBytes="303"
firstByteStart="1120761544215" firstByteTime="23"
contentStart="1120761544238" contentTime="1" responseTime="24"
urlHost="http://i.a.cnn.net"
urlPage="/cnn/.element/img/1.3/searchbar/nav.powered.gif" />
    <ObjectSummary responseCode="200" contentType="text/html"
objId="151" connectionId="9" hostId="6" numBytes="7880"
firstByteStart="1120761544221" firstByteTime="85"
contentStart="1120761544306" contentTime="31" responseTime="116"
urlHost="http://cl.cnn.com" urlPage="/ctxtlink/jsp/cnn/cl/1.3/cnn-
section.jsp"
urlParam="?domId=contextualLinks&time=1120761546649&id=cnnpolit
ics&site=cnn_politics_ctxt" />
    <ObjectSummary responseCode="200" contentType="image/jpeg"
objId="141" connectionId="1" hostId="1" numBytes="1288"
firstByteStart="1120761544228" firstByteTime="36"
```

```
contentStart="1120761544264" contentTime="0" responseTime="36"
urlHost="http://i.cnn.net"
urlPage="/cnn/video/politics/2005/07/07/sots.giuliani.terror.vs.cnn.jpg
" />
    <ObjectSummary responseCode="200" contentType="image/gif"
objId="152" connectionId="7" hostId="1" numBytes="632"
firstByteStart="1120761544234" firstByteTime="40"
contentStart="1120761544274" contentTime="0" responseTime="40"
urlHost="http://i.cnn.net"
urlPage="/cnn/.element/img/1.3/sect/POLITICS/shdr.other.news.gif" />
    <ObjectSummary responseCode="200" contentType="image/gif"
objId="132" connectionId="5" hostId="4" numBytes="1603"
firstByteStart="1120761544239" firstByteTime="21"
contentStart="1120761544260" contentTime="1" responseTime="22"
urlHost="http://i.a.cnn.net"
urlPage="/cnn/.element/img/1.3/searchbar/nav.yahoo.gif" />
    <ObjectSummary responseCode="200" contentType="image/gif"
objId="133" connectionId="6" hostId="4" numBytes="100"
firstByteStart="1120761544239" firstByteTime="25"
contentStart="1120761544264" contentTime="0" responseTime="25"
urlHost="http://i.a.cnn.net"
urlPage="/cnn/.element/img/1.3/nav/search.bot.gif" />
    <ObjectSummary responseCode="200" contentType="image/gif"
objId="134" connectionId="5" hostId="4" numBytes="2840"
firstByteStart="1120761544261" firstByteTime="22"
contentStart="1120761544283" contentTime="1" responseTime="23"
urlHost="http://i.a.cnn.net"
urlPage="/cnn/.element/img/1.3/sect/POLITICS/hdr.politics.gif" />
    <ObjectSummary responseCode="200" contentType="image/jpeg"
objId="135" connectionId="6" hostId="4" numBytes="18667"
firstByteStart="1120761544264" firstByteTime="25"
contentStart="1120761544289" contentTime="64" responseTime="89"
urlHost="http://i.a.cnn.net"
urlPage="/cnn/2005/WORLD/europe/07/07/world.reax/top.bush.thurs3.ap.jpg
" />
    <ObjectSummary responseCode="200" contentType="image/gif"
objId="155" connectionId="1" hostId="1" numBytes="292"
firstByteStart="1120761544265" firstByteTime="36"
contentStart="1120761544301" contentTime="0" responseTime="36"
urlHost="http://i.cnn.net"
urlPage="/cnn/.element/img/1.3/sect/POLITICS/shdr.time.gif" />
    <ObjectSummary responseCode="200" contentType="image/gif"
objId="158" connectionId="7" hostId="1" numBytes="750"
firstByteStart="1120761544274" firstByteTime="44"
contentStart="1120761544318" contentTime="0" responseTime="44"
urlHost="http://i.cnn.net"
urlPage="/cnn/.element/img/1.3/sect/POLITICS/shdr.opinion.analysis.gif"
/>
    <ObjectSummary responseCode="200" contentType="image/jpeg"
objId="137" connectionId="5" hostId="4" numBytes="4037"
firstByteStart="1120761544285" firstByteTime="23"
contentStart="1120761544308" contentTime="1" responseTime="24"
urlHost="http://i.a.cnn.net"
urlPage="/cnn/2005/POLITICS/07/06/scotus.twovacancies.ap/tz.rehnquist.a
p.jpg" />
    <ObjectSummary responseCode="200" contentType="image/gif"
objId="160" connectionId="1" hostId="1" numBytes="563"
```

```
firstByteStart="1120761544302" firstByteTime="36"
contentStart="1120761544338" contentTime="0" responseTime="36"
urlHost="http://i.cnn.net"
urlPage="/cnn/.element/img/1.3/sect/POLITICS/shdr.cartoons.gif" />
    <ObjectSummary responseCode="200" contentType="image/jpeg"
objId="138" connectionId="5" hostId="4" numBytes="2917"
firstByteStart="1120761544310" firstByteTime="22"
contentStart="1120761544332" contentTime="0" responseTime="22"
urlHost="http://i.a.cnn.net"
urlPage="/cnn/2005/POLITICS/07/06/santorum.book.ap/tz.santorum.jpg" />
    <ObjectSummary responseCode="200" contentType="image/jpeg"
objId="161" connectionId="7" hostId="1" numBytes="3885"
firstByteStart="1120761544318" firstByteTime="53"
contentStart="1120761544371" contentTime="28" responseTime="81"
urlHost="http://i.cnn.net"
urlPage="/cnn/POLITICS/analysis/toons/2005/07/07/lang/tz.jpg" />
    <ObjectSummary responseCode="200" contentType="image/jpeg"
objId="154" connectionId="5" hostId="4" numBytes="3923"
firstByteStart="1120761544334" firstByteTime="29"
contentStart="1120761544363" contentTime="9" responseTime="38"
urlHost="http://i.a.cnn.net"
urlPage="/cnn/2005/POLITICS/07/06/bush.scotus.ap/tz.bush.gonzales.file.
ap.jpg" />
    <ObjectSummary responseCode="200" contentType="image/jpeg"
objId="157" connectionId="6" hostId="4" numBytes="2165"
firstByteStart="1120761544353" firstByteTime="41"
contentStart="1120761544394" contentTime="1" responseTime="42"
urlHost="http://i.a.cnn.net"
urlPage="/cnn/2005/POLITICS/07/04/tipping.point.tm/tz.time.jpg" />
    <ObjectSummary responseCode="200" contentType="image/jpeg"
objId="159" connectionId="5" hostId="4" numBytes="4008"
firstByteStart="1120761544372" firstByteTime="24"
contentStart="1120761544396" contentTime="1" responseTime="25"
urlHost="http://i.a.cnn.net"
urlPage="/cnn/2005/POLITICS/07/04/gipper.hillary/tz.shields.jpg" />
    <ObjectSummary responseCode="200" contentType="image/gif"
objId="162" connectionId="6" hostId="4" numBytes="519"
firstByteStart="1120761544396" firstByteTime="27"
contentStart="1120761544423" contentTime="1" responseTime="28"
urlHost="http://i.a.cnn.net"
urlPage="/cnn/.element/img/1.3/misc/sect.fb.top.gif" />
    <ObjectSummary responseCode="200" contentType="image/gif"
objId="163" connectionId="5" hostId="4" numBytes="161"
firstByteStart="1120761544397" firstByteTime="26"
contentStart="1120761544423" contentTime="13" responseTime="39"
urlHost="http://i.a.cnn.net"
urlPage="/cnn/.element/img/1.3/misc/sect.fb.bottom.gif" />
    <ObjectSummary responseCode="200" contentType="image/gif"
objId="169" connectionId="6" hostId="4" numBytes="43"
firstByteStart="1120761544424" firstByteTime="27"
contentStart="1120761544451" contentTime="0" responseTime="27"
urlHost="http://i.a.cnn.net" urlPage="/cnn/1.gif" />
    <ObjectSummary responseCode="200" contentType="image/gif"
objId="170" connectionId="5" hostId="4" numBytes="61"
firstByteStart="1120761544443" firstByteTime="34"
contentStart="1120761544477" contentTime="4" responseTime="38"
```

```
urlHost="http://i.a.cnn.net"
urlPage="/cnn/.element/img/1.1/misc/cl/cl_bar.gif" />
    <ObjectSummary responseCode="200" contentType="image/gif"
objId="171" connectionId="6" hostId="4" numBytes="147"
firstByteStart="1120761544452" firstByteTime="26"
contentStart="1120761544478" contentTime="0" responseTime="26"
urlHost="http://i.a.cnn.net"
urlPage="/cnn/.element/img/1.1/misc/cl/advlinks1.gif" />
    <ObjectSummary responseCode="200" contentType="image/gif"
objId="172" connectionId="6" hostId="4" numBytes="132"
firstByteStart="1120761544481" firstByteTime="27"
contentStart="1120761544508" contentTime="1" responseTime="28"
urlHost="http://i.a.cnn.net"
urlPage="/cnn/.element/img/1.1/misc/cl/whatsthis_white.gif" />
  </PageSummary>
</PutStatisticsRequest>
```

Example Performance Metrics 190

Output from Script Execution

In the above performance metrics 190, the numbers in square braces have been added in this document for purposes of identifying specific items in this output and are not considered to be part of the actual example performance metrics 190.

As can be seen from the above sample collected performance metrics, significant details of performance of a transaction are collected by embodiments of the agent processing explained herein.

Figure 3:
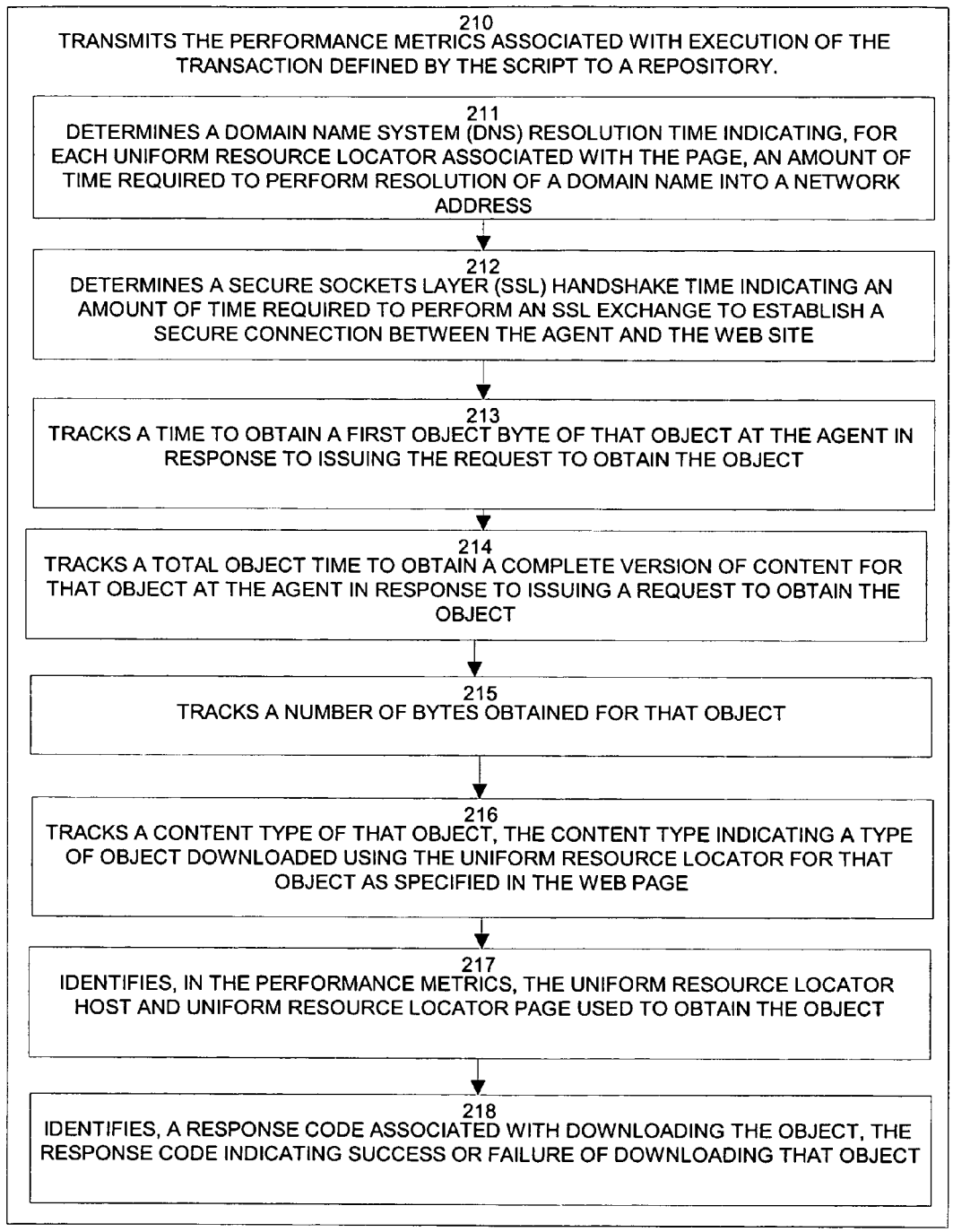
FIG. 3 is a flow chart of processing steps that shows object performance metrics collected by an agent in accordance with one example configuration of the invention.

FIG. 3 is a flow chart that illustrates example processing steps that an agent 150 performs to collect the above example performance metrics 190 and reference will be made to the above performance metrics 190 during description of these processing steps.

In step 210, the agent 150 tracks respective performance metrics 190 related to obtaining each object using the uniform resource locator for that object as specified in the web page 135. Steps 211 through 218 show details of this processing.

In step 211, the agent 150 determines a domain name system (DNS) resolution time indicating (as shown at location 830 in the above example), for each uniform resource locator associated with the web page 135. This is maintained in a Host section of the performance metrics that summarizes the performance metrics associated with connecting to each host required for all objects in the transaction. As an example, detailed metrics can be collected on hosts contacted during the transaction as shown by this section concerning host performance metrics as taken from the above performance metrics 190:

```
<Host host="i.cnn.net" ip="64.236.24.138" id="1"
pageId="0" DNSStart="1120761542382" DNSTime="0"
numConnections="2" numBytes="118708" numObjects="35" numErrors="0">
    <Connection id="1" pageId="0" endPageId="1"
port="80" connectStart="1120761542382" connectTime="30" responseTime="1956" numErrors="0" numObjects="22" numBytes="100180"/>
    <Connection id="7" pageId="0" endPageId="1"
port="80" connectStart="1120761542983" connectTime="31" responseTime="1416" numErrors="0" numObjects="13" numBytes="18528"/>
</Host>
```

Example Host Performance Metrics

Showing Metrics for Two Connections Made to Host "i.cnn.net"

Note the amount of details that the agent 150 collects concerning the connections and host metrics. Many are self-explanatory from a review of the above metrics. The DNS resolution time is an amount of time required to perform resolution of a domain name into a network address. This performance metric can be tracked for any URL that needs a DNS resolution. In this example, the "DNSStart" and "DNSTime" parameters represent time metrics for DNS processing. DNSStart is the timestamp of the start of the DNS time while DNSTime is the duration of the DNS lookup processing including all communications to perform the lookup. Also collected for DNS resolutions are performance metrics related to number of connections made, number of bytes transferred, number of errors encountered and the like. After the Host section of the performance metrics 190, for each page request in the script 180 there is a Page Summary section of the performance metrics as shown, for example, at location 831 (on the second or third page of the performance metrics 190 above) in the sample output. The "PageSummary" section (e.g. 831) summarizes times and error codes relevant to obtaining the overall page. Following each "PageSummary" section 830 are a set of zero or more object summary (labeled "ObjectSummary") sections, one for each object of the web page corresponding to that page request 802. An example object summary is shown at location 833.

In step 212, the agent 150 determines a secure sockets layer (SSL) handshake time indicating an amount of time required to perform an SSL exchange to establish a secure connection between the agent 150 and the web site 130. This is optional and applies if SSL is used. The above example agent performance metrics do not include an example of SSL handshake time.

In step 213 and as shown at location 832 in the sample output above, the agent 150 tracks a time to obtain a first object byte of an object at the agent 150 in response to issuing the request to obtain the object. As an example as shown generally at location 840, performance metrics collected on a per object basis are numerous. The time to first byte is an amount of time required from the invocation of the URL GET request to the time the first byte arrives at the agent 150. This time provides an accurate reflection of how well the web server 130 is performing since the web server must full prepare the object before returning its first byte to the agent 150.

In step 214 and as shown at location 834 in the sample performance metrics above, the agent 150 tracks a total object time to obtain a complete version of content for that object at the agent 150 in response to issuing a request to obtain the object. Total object time may be a collection of one or more time values, such as a content start time stamp ("contentStart" in the example), a total content time ("contentTime") and a response time ("responseTime"). Total object time is equal to responseTime, and responseTime is equal to the sum of firstByteTime and contentTime In step 215, the agent 150 tracks a number of bytes obtained for that object as shown at location 836.

In step 216, the agent 150 tracks a content type of that object as shown at location 837. The content type 837 indicates a type of object downloaded using the uniform resource locator for that object as specified in the web page In step 217, the agent 150 identifies, in the performance metrics as shown at locations 838 and 839, the uniform resource locator host and uniform resource locator page used to obtain the object In step 218 and as shown at location 840, the agent 150 identifies, a response code associated with downloading the object. The response code 840 indicates success or failure of downloading that object.

Using the aforementioned collected performance metrics, detailed analysis of web site performance may be achieved indicating specific pages and objects within those pages of a multi-page transaction that are performing below average in relation to other pages, other transactions, or other objects.

Figure 4:
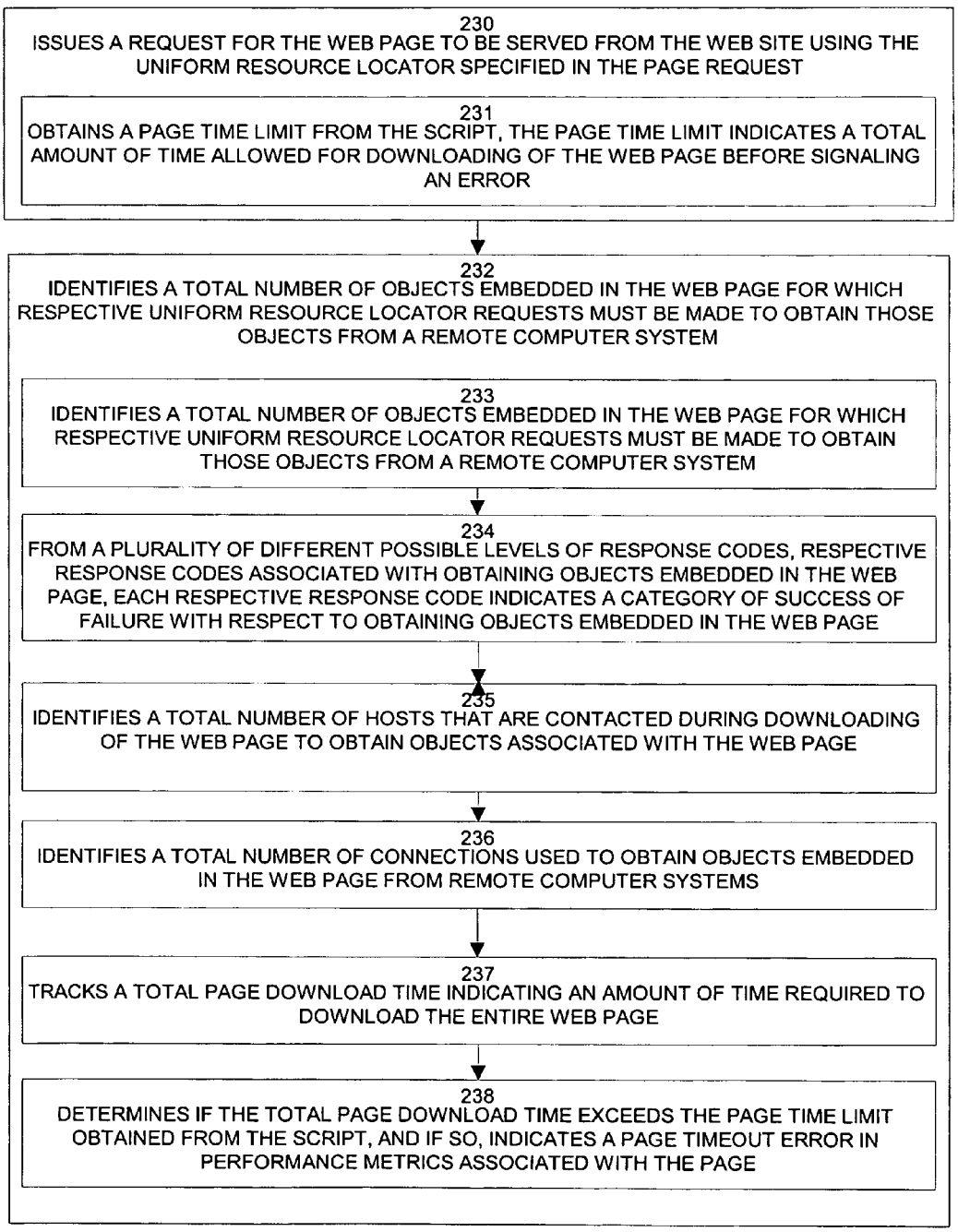
FIG. 4 is a flow chart of processing steps that shows web page performance metrics collected by an agent in accordance with one example configuration of the invention.

FIG. 4 is a flow chart of processing steps that an agent 150 performs to track performance metrics for web pages of a transaction. This flow chart explains further details of the processing of step 201 from the flow chat in FIG. 2.

In step 230, the agent 150 issues a request 192 for the web page 135 to be served from the web site 130 using the uniform resource locator specified in the page request 802.

In step 231, the agent 150 obtains a page time limit from the script. The page time limit indicates a total amount of time to wait for the entire page (including all objects) before giving up. Thus the script 180 can specify how long of a time to wait before indicating a page error from a server.

In step 232, the agent 150 identifies respective performance metrics associated with obtaining a complete version of each web page. Performance metrics for a web page can include summarizations of object performance metrics for all objects loaded in that web page.

In step 233, the agent 150 identifies a total number of objects embedded in the web page for which respective uniform resource locator requests must be made to obtain those objects from a remote computer system. This metric tracks total objects per page as shown at location 845 in the example output above.

In step 234, the agent 150 identifies, from a plurality of different possible levels of response codes, respective response codes associated with obtaining objects embedded in the web page. Response codes are shown at location 850 in the example performance metric output above. Each respective response code indicates a category of success of failure with respect to obtaining objects embedded in the web page. Respective response codes are tracked for different response code levels, such as 200 level HTTP codes, 300 level HTTP codes, 400 level, and 500 level web page errors. Likewise, counts of numbers of objects that result in network errors are also tracked.

In step 235, the agent 150 identifies a total number of hosts that are contacted during downloading of the web page to obtain objects associated with the web page. Total host count is shown at location 852 in the example output.

In step 236, the agent 150 identifies a total number of connections used to obtain objects embedded in the web page from remote computer systems. This is shown at location 853 in the example performance metrics shown above.

In step 237, the agent 150 tracks a total processing time indicating an amount agent processing required during a transaction. As shown as the performance metric "processignTime" at location 854 in the example performance metrics shown above, processingTime is the amount of time that the agent spends parsing HTML and JavaScript while downloading the page. processingTime is an internal metric used to track the amount of work the agent needs to do to handle the transaction and does not include the network download times that are captured in the response time metrics.

In step 238, the agent 150 determines if the total page download time exceeds the page time limit obtained from the script, and if so, indicates a page timeout error in performance metrics associated with the page. In this manner, if a total time to download a web page exceeds the page timeout limit established in step 231 above, an error is indicated as "pageTimeoutStatus" at location 855 in the example performance metrics above. In the example, "pageTimeoutStatus" is set to "0" since there was no page timeout.

Figure 5:
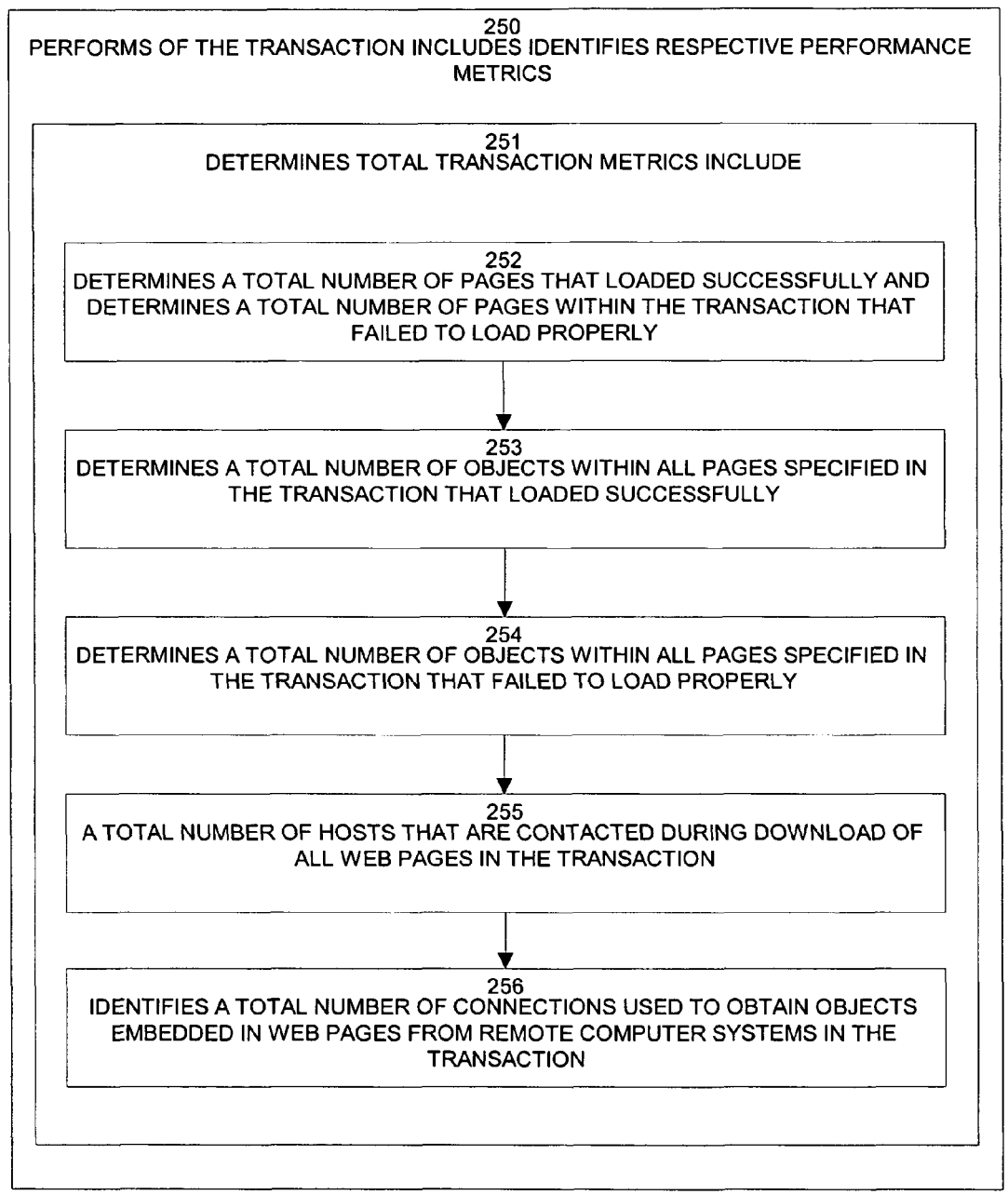
FIG. 5 is a flow chart of processing steps that shows transaction performance metrics collected by an agent in accordance with one example configuration of the invention.

FIG. 5 is a flow chart that shows processing steps that the agent 150 performs to collect total transaction metrics.

In step 250, the agent 150 performs the transaction including identifying respective performance metrics as noted above.

In step 251, the agent 150 determines total transaction metrics. Details of identifying transaction metrics are shown in steps 252 through 256.

In step 252, the agent 150 determines a total number of pages that loaded successfully and determines a total number of pages within the transaction that failed to load properly. These metrics are shown at locations 856 and 857 as "numPagesSuccess" and "nmuPageFailed" in the example performance metrics shown above.

In step 253, the agent 150 determines a total number of objects within all pages specified in the transaction that loaded successfully, as shown at location 858 ("numObjects") in the example performance metrics shown above.

In step 254, the agent 150 determines a total number of objects within all pages specified in the transaction that failed to load properly as shown at location 859 ("numObjectsFailed") in the example performance metrics shown above.

In step 255, the agent 150 identifies a total number of hosts 107 that are contacted during downloading of all web pages in the transaction as shown at location 860 ("numHosts") in the example performance metrics shown above.

In step 256, the agent 150 identifies a total number of connections used to obtain objects embedded in web pages from remote computer systems in the transaction as shown at location 861 ("numConns") in the example performance metrics shown above.

As can be seen from the amount of details collected for each page in a transaction, the agent 150 is quite robust.

Figure 6:
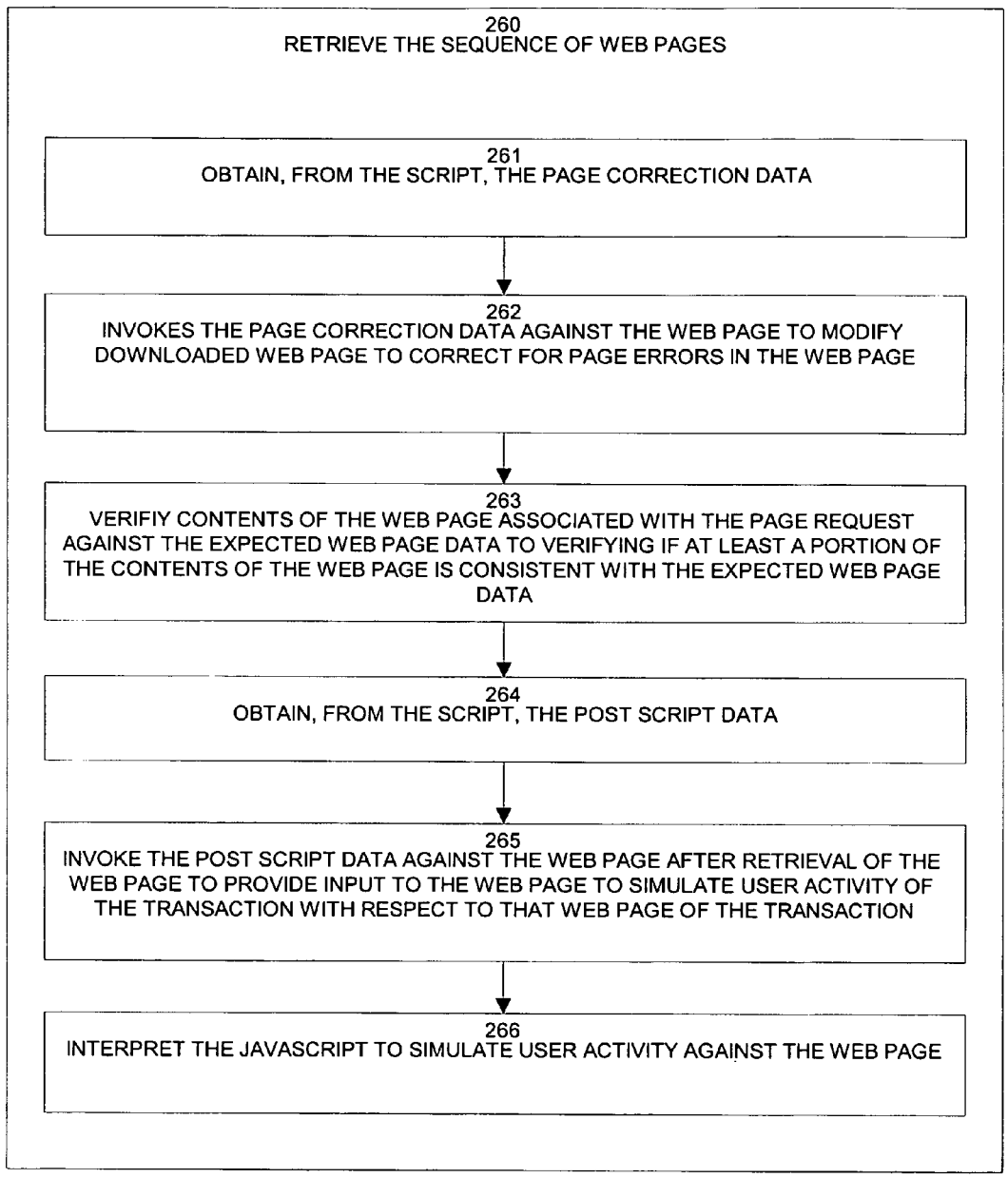
FIG. 6 is a flow chart of processing steps that shows processing operations performed by an agent to validate web page contents and provide user input and correct web page errors in accordance with one example configuration of the invention.

FIG. 6 is a flow chart of processing steps that show details of agent processing to retrieve a sequence of web pages in a transaction as defined in a script 180 and provide verification of page contents, correction of HTML problems in the page, and presentation of user input to the page.

In step 260, the agent 150 retrieves the sequence of web pages. Details of processing involved to carry out the above noted operations are shown in steps 261 through 266.

In step 261, the agent 150 obtains, from the script, page correction data 811-1. An example of page correction data 811-1 is shown in the first example script 180-1 for the Wachovia transaction. The page correction data 811-1 is base-64 encoded JavaScript.

In step 262, the agent 150 invokes the page correction data 811-1 against the web page to modify downloaded web page content to correct for page errors in the web page. Page errors may be present in certain objects due to poor HTML web page design. Steps 261 and 262 correct for these page errors.

In step 263, the agent 150 verifies contents of the web page 135 associated with the page request 802 against expected web page data 814-1 and 814-2 to verify if at least a portion of the contents of the web page is consistent with the expected web page data 814. This allows the agent 150 to verify that the web server 130 served the proper web page 135 to the agent in response to issuing the URL specified in the page request 802 (e.g. www.wachovia.com for page request 802-1 in the above example script 180-1).

In step 264, the agent 150 obtains, from the script 180, post script data 808. As noted in the above example script 180-1, the post script data section beginning at location 808-1 and ending at location 809-1 defines base-64 encoded JavaScript that is user script to be executed by the agent 150 to simulate user input once the page at the URL for this page request 802-1 has been fully obtain by the agent 150 from the web server 130 that serves this page. The purpose for providing the JavaScript in base-64 is so that the XML data format of the script 180 is not disturbed with JavaScript characters. It is noted that other encoding formats can be used as well besides base-64.

In step 265, the agent 150 invokes the post script data against the web page 135 after retrieval of the web page 135 to provide input to the web page 135 to simulate user activity of the transaction with respect to that web page 135 of the transaction.

In step 266, the agent 150 interprets the JavaScript to simulate user activity against the web page.

In this manner, the agent 150 can obtain a page while tracking transaction, page and object level metrics, verify the page content, correct for any page errors, and provide user input to the page, thus furthering the transaction on its course to completion. Each page request 802 can include some of all of this processing. For example, some pages may not require user input and thus no post script data section need be defined for the page request for that page 135.

Figure 7:
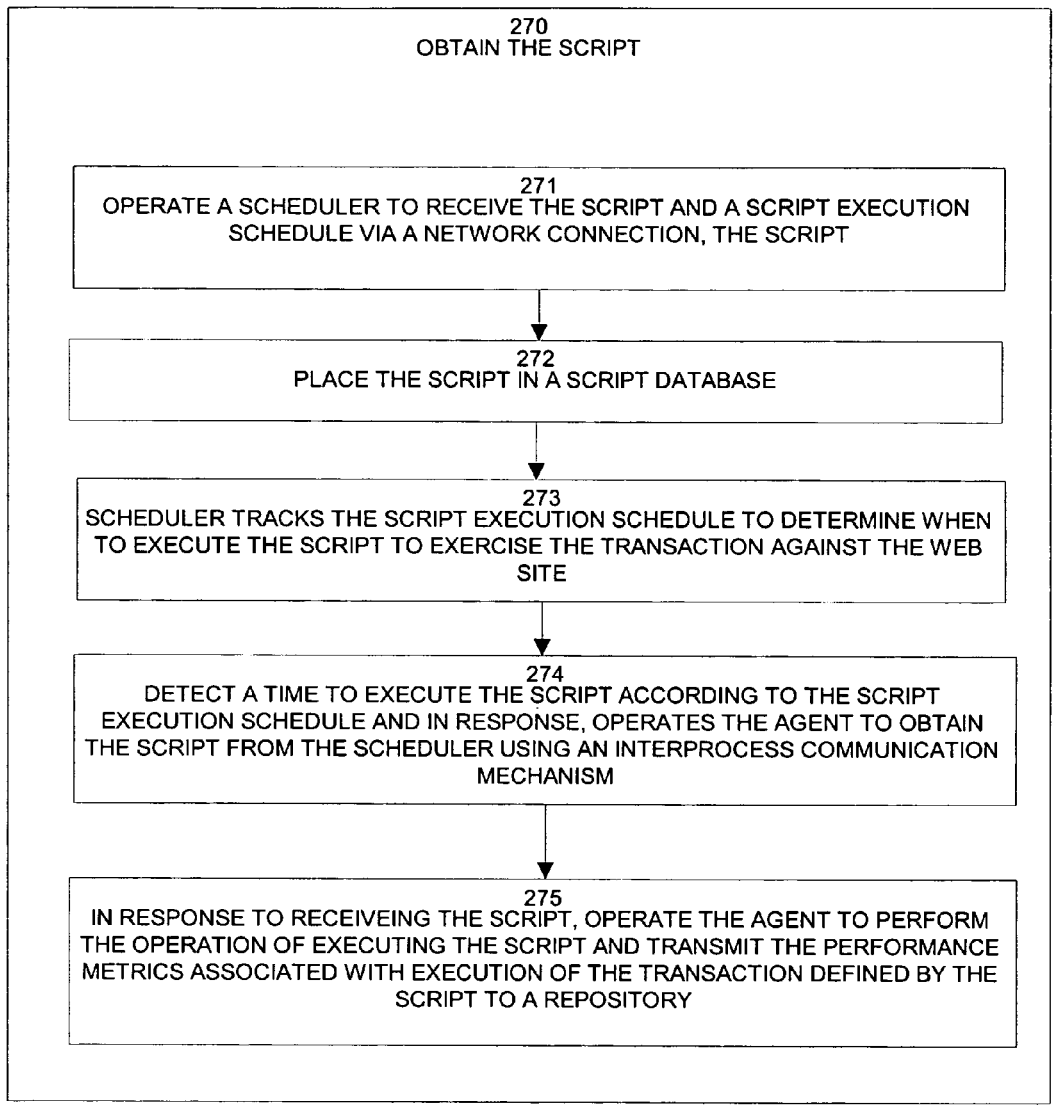
FIG. 7 is a flow chart of processing steps that shows script scheduling operations performed by a scheduler and an agent in accordance with one example configuration of the invention.

FIG. 7 is a flow chart of processing steps that the scheduler 140 and the agent 150 perform to obtain the script 180 from the agent command and control process 160 and initiate execution of the script with the agent 150.

In step 270, the scheduler 140 obtains the script from the agent command and control process 160 via a network connection on the network 101. Details of this processing are shown in steps 271 through 275.

In step 271, the scheduler 140 receives the script and a script execution schedule via a network connection. The script execution schedule indicates when the script is to be run, executed or otherwise performed by the agent (executing the script as defined herein).

In step 272, the scheduler 140 places the script in a script database 195. The script database can contain any number of scripts 180 that each defines any number of transactions with any number of web sites. There can also be more than one scheduler and more than one agent 150 operating on each agent computer system 150.

In step 273, the scheduler 140 tracks the script execution schedule to determine when to execute the script 180 to exercise the transaction against the web site 130.

In step 274, the scheduler 140 detects a time to execute the script 180 according to the script execution schedule and in response, passes the script 180 to the agent, thus operating the agent 150 to obtain the script 180 from the scheduler 140 using an inter-process communication mechanism such as TCP socket communications.

In step 275, in response to receiving the script, the agent 150 performs the operations of executing the script and transmitting the performance metrics associated with execution of the transaction defined by the script to a repository 170 maintained by the agent command and control process 160.

In this manner, the scheduler 140 manages receiving the scripts 180 and coordinating invocation of scripts 180 on each agent 150 in an agent computer system 105.

Figure 8:
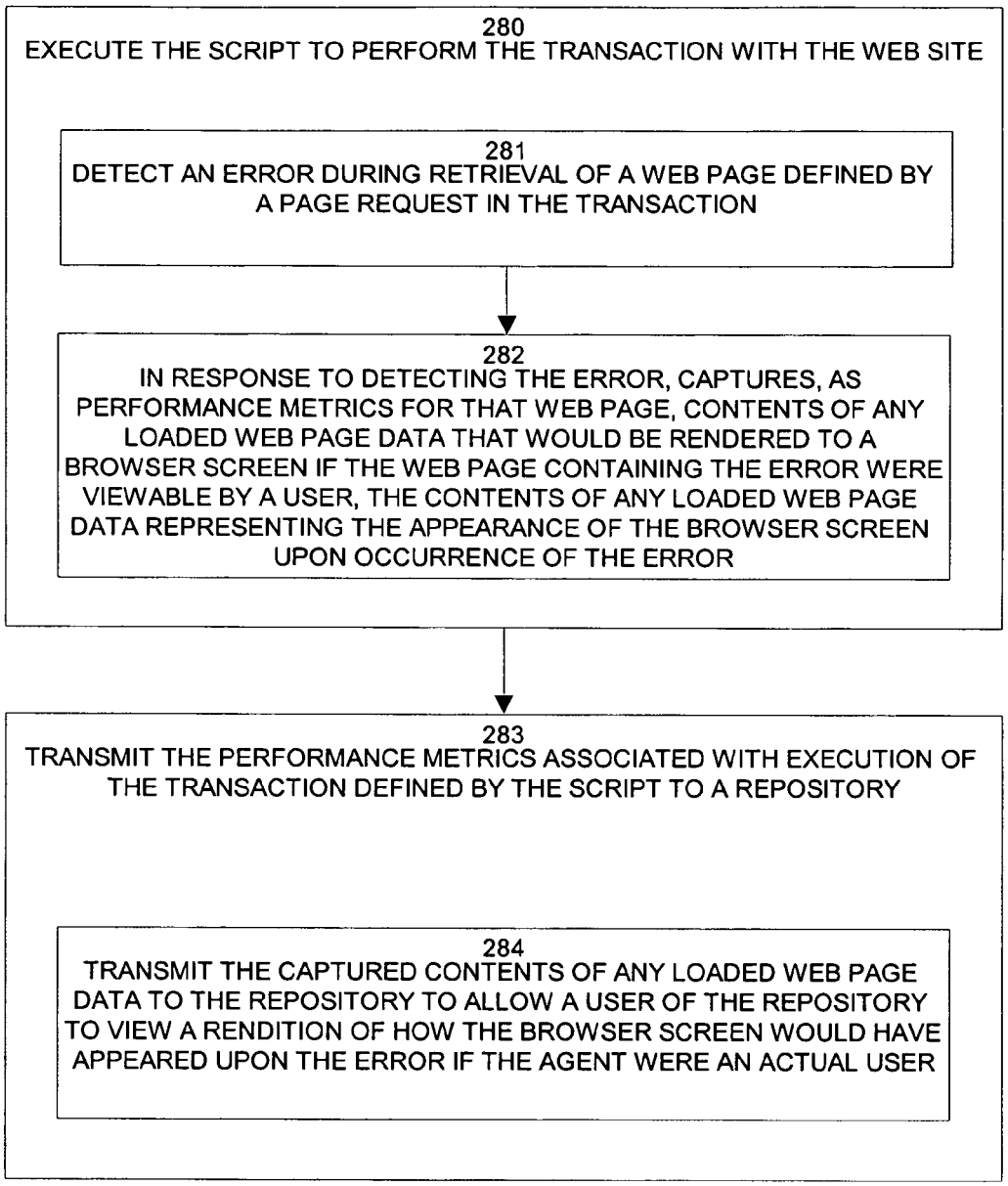
FIG. 8 is a flow chart of processing steps that shows operations performed by an agent to capture a screen within the performance metrics on occurrence of an error in a web page in accordance with one example configuration of the invention.

FIG. 8 is a flow chart of processing steps that the agent performs to capture a web page as it would appear on the screen to a user in the event an error has occurred during downloading of that web page.

In step 280, the agent 150 executes the script 180 to perform the transaction with the web server 130 serving a web site.

In step 281, the agent 150 detects an error during retrieval of a web page 135 defined by a page request 802 in the transaction. The error may be a page cannot load error, or an error the occurs after the page has loaded but during execution of post script data that is providing user input to the page. Any type or level of error may be detected to trigger this action.

In step 282, in response to detecting the error, the agent 150 captures, as performance metrics 190 for that web page 135, contents of any loaded web page data that would be rendered to a browser screen if the web page containing the error were viewable by a user. The contents of any loaded web page data represents the appearance of the browser screen upon occurrence of the error. As a result, the agent 150 is able to perform a screen capture upon occurrence of an error and can put this screen capture (from memory) into the performance metrics that are transported back to the agent command and control process 160 operating on the repository computer system 108.

In step 283, the agent 150 transmits the performance metrics 190 associated with execution of the transaction defined by the script to a repository 170.

In step 284, the agent 150 transmits the captured contents of any loaded web page data to the repository to allow a user of the repository to view a rendition of how the browser screen would have appeared upon the error if the agent 150 were an actual user. This allows an operator 118 of the repository computer system 108 to determine exactly how a browser display would have appears if an actual user has been performing the transaction upon occurrence of the error.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. Using an agent executing remotely from a web site, a method for measuring performance associated with the web site, the method comprising:
   obtaining a script, wherein the script includes:
      at least one transaction to be performed with the web site, the at least one transaction defining a sequence of page requests identifying web pages to obtain from the web site, wherein each page request in the script specifies a uniform resource locator of a web page on the web site associated with the transaction, wherein at least one page request in the script defines expected web page data indicating data to be present within the web page; and
      page correction data that defines page error corrections to be made to web page data after retrieval based at least in part on the expected web page data not being present in the web page;
   executing the script to perform the transaction with the web site, wherein executing the script to perform the transaction with the web site comprises:
      for each page request defined in the script, issuing a request for the web page to be served from the web site using the uniform resource locator specified in the page request; and
      during retrieval of the web page, detecting objects embedded in the web page; and
      wherein performance of the transaction includes:
         retrieving the sequence of web pages and identifying respective performance metrics, wherein the respective performance metrics include:
            i) performance metrics associated with obtaining respective objects defined within each web page; and
            ii) performance metrics associated with obtaining a complete version of each web page;
         invoking the page correction data against a retrieved web page to modify the retrieved web page to correct for page errors in the retrieved web page, including modifying the HyperText Markup Language (HTML) of the retrieved web page; and
         verifying contents of a modified web page associated with the page request against the expected web page data to verify whether at least a portion of the contents of the modified web page is consistent with the expected web page data; and
   transmitting the performance metrics associated with execution of the transaction defined by the script to a repository.

2. The method of claim 1 wherein identifying respective performance metrics associated with obtaining respective objects defined within each web page comprises:
   tracking a time to obtain a first object byte of a first object at the agent in response to issuing a request to obtain the first object;
   tracking a total object time to obtain a complete version of content for the first object at the agent in response to issuing a request to obtain the first object; and
   tracking a number of bytes obtained for the first object.

3. The method of claim 1 wherein identifying respective performance metrics associated with obtaining respective objects defined within each web page comprises:
   tracking a content type of a first object, the content type indicating a type of object downloaded using the uniform resource locator for the first object as specified in the web page;
   identifying, in the performance metrics, the uniform resource locator host and uniform resource locator page used to obtain the first object; and
   identifying, in the performance metrics, a response code associated with downloading the first object, the response code indicating success or failure of downloading the first object.

4. The method of claim 1 wherein issuing a request for the web page to be served from the web site using the uniform resource locator specified in the page request comprises:
   obtaining a page time limit from the script, the page time limit indicating a total amount of time allowed for downloading of the web page before signaling an error; and
   wherein identifying respective performance metrics associated with obtaining a complete version of each web page occurs while performing retrieval of the web page and comprises:
      tracking a total page download time indicating an amount of time required to download the web page; and
      determining whether the total page download time exceeds the page time limit obtained from the script, and when the total page download time exceeds the page time limit, indicating a page timeout error in performance metrics associated with the web page.

5. The method of claim 1 wherein identifying respective performance metrics associated with obtaining a complete version of each web page comprises:
   identifying a total number of objects embedded in the web page for which respective uniform resource locator requests must be made to obtain those objects from a remote computer system;
   identifying, from a plurality of different possible levels of response codes, respective response codes associated with obtaining objects embedded in the web page, each respective response code indicating a category of success or failure with respect to obtaining objects embedded in the web page;
   identifying a total number of hosts that are contacted during downloading of the web page to obtain objects associated with the web page; and
   identifying a total number of connections used to obtain objects embedded in the web page from remote computer systems.

6. The method of claim 1 wherein performance of the transaction including identifying respective performance metrics comprises:
   determining total transaction metrics including:
      determining a total number of pages that loaded successfully;
      determining a total number of pages within the transaction that failed to load properly;
      determining a total number of objects within all pages specified in the transaction that loaded successfully;
      determining a total number of objects within all pages specified in the transaction that failed to load properly;
      identifying a total number of hosts that are contacted during downloading of all web pages in the transaction; and
      identifying a total number of connections used to obtain objects embedded in web pages from remote computer systems in the transaction.

7. The method of claim 1 further comprising:
   determining a secure sockets layer (SSL) handshake time indicating an amount of time required to perform an SSL exchange to establish a secure connection between the agent and the web site.

8. The method of claim 1 wherein the script further includes post script data that defines input to be provided to the web page to simulate user activity of the transaction with respect to the web page of the transaction and wherein executing the script to perform the transaction with the web site further comprises:
   obtaining, from the script, the post script data; and
   invoking the post script data against the modified web page to provide input to the modified web page to simulate user activity of the transaction with respect to the modified web page.

9. The method of claim 1 wherein obtaining the script comprises:
   operating a scheduler to receive the script and a script execution schedule via a network connection;
   placing the script in a script database;
   the scheduler tracking the script execution schedule to determine when to execute the script to exercise the transaction against the web site;
   detecting a time to execute the script according to the script execution schedule and in response, operating the agent to obtain the script from the scheduler using an interprocess communication mechanism; and
   in response to receiving the script, operating the agent to perform operations of executing the script and transmitting the performance metrics associated with execution of the transaction defined by the script to a repository.

10. The method of claim 1 wherein executing the script to perform the transaction with the web site further comprises:
    detecting an error during retrieval of a web page defined by a page request in the transaction; and
    in response to detecting the error, capturing, as performance metrics for the web page, contents of any loaded web page data that would be rendered to a browser screen when the web page containing the error is requested by a user, the contents of any loaded web page data representing the appearance of the browser screen upon occurrence of the error; and
    wherein transmitting the performance metrics associated with execution of the transaction defined by the script to a repository comprises:
    transmitting the captured contents of any loaded web page data to the repository to allow a user of the repository to view a rendition of how the browser screen would have appeared upon the error to an actual user.

11. The method of claim 1 wherein the script further includes a page summary indicator that indicates only a summary of performance metrics associated with the transaction are to be returned to the repository and wherein transmitting the performance metrics associated with execution of the transaction defined by the script to a repository comprises:

reducing a total amount of collected performance metrics related to obtaining objects using uniform resource locators to a statistical summary of performance metrics for each web page, the statistical summary being less than all collected performance metrics for each web page; and transferring the statistical summary of the performance metrics for each web page in the transaction such that not all collected performance metrics are transferred from the agent to the repository.

12. The method of claim 1 wherein the agent operates on a remote computer system as an autonomous process without user interaction during execution of the script, the agent executing the script to simulate user interaction with the web site and to collect performance metrics associated with downloading web pages from the web site during performance of the transaction with the web site.

13. The method of claim 1 further comprising obtaining the embedded objects from a uniform resource locator different from the uniform resource locator invoking the web page.

14. The method of claim 13 wherein each object embedded in the web page has an independent uniform resource locator internal or external to the uniform resource locator of the invoking web page.

15. The method of claim 14 wherein identifying respective performance metrics associated with obtaining respective objects defined within each web page comprises obtaining each object via the uniform resource locator denoting the object, the respective performance metrics including a Domain Name Service (DNS) resolution time for locating the object.

16. The method of claim 1, wherein modifying the HTML of the retrieved web page comprises modifying a document object model (DOM) of the HTML of the retrieved web page.

17. A computer system comprising:
a memory;
a processor;
a network interface; and
an interconnection mechanism coupling the memory, the processor and the network interface;
wherein the memory is encoded with an agent application that when executed on the processor, produces an agent process that causes the computer system to measure performance associated with a web site accessible on a network via the network interface by causing the computer system to perform operations of:
obtaining a script, wherein the script includes:
at least one transaction to be performed with the web site, the at least one transaction defining a sequence of page requests identifying web pages to obtain from the web site, each page request in the script specifying a uniform resource locator of a web page on the web site associated with the transaction, wherein at least one page request in the script defines expected web page data indicating data to be present within the web page; and
page correction data that defines page error corrections to be made to web page data after retrieval based at least in part on the expected web page data not being present in the web page;
executing the script to perform the transaction with the web site, executing including, for each page request defined in the script:
issuing a request for the web page to be served from the web site using the uniform resource locator specified in the page request; and
during retrieval of the web page, detecting objects embedded in the web page with page errors; and
wherein performance of the transaction includes:
retrieving the sequence of web pages and identifying respective performance metrics, wherein the respective performance metrics include:
i) performance metrics associated with obtaining respective objects defined within each web page; and
ii) performance metrics associated with obtaining a complete version of each web page;
invoking the page correction data against a retrieved web page to modify the retrieved web page to correct for page errors in the retrieved web page, including modifying the HyperText Markup Language (HTML) of the retrieved web page; and
verifying contents of a modified web page associated with the page request against the expected web page data to verify whether at least a portion of the contents of the modified web page is consistent with the expected web page data; and
transmitting the performance metrics associated with execution of the transaction defined by the script to a repository via the network interface.

18. The computer system of claim 17 wherein when the computer system performs the operation of identifying respective performance metrics associated with obtaining respective objects defined within each web page, the computer system performs operations of:
tracking a time to obtain a first object byte of a first object at the agent in response to issuing a request to obtain the first object;
tracking a total object time to obtain a complete version of content for the first object at the agent in response to issuing a request to obtain the first object; and
tracking a number of bytes obtained for the first object.

19. The computer system of claim 17 wherein the script further includes post script data that defines input to be provided to the web page to simulate user activity of the transaction with respect to the web page of the transaction and wherein when the computer system performs the operation of executing the script to perform the transaction with the web site, the computer system further performs operations of:
obtaining, from the script, the post script data; and
invoking the post script data against the modified web page to provide input to the modified web page to simulate user activity of the transaction with respect to the modified web page.

20. The computer system of claim 17 wherein when the computer system performs the operation of executing the script to perform the transaction with the web site, the computer system further performs operations of:
detecting an error during retrieval of a web page defined by a page request in the transaction; and
in response to detecting the error, capturing, as performance metrics for the web page, contents of any loaded web page data that would be rendered to a browser screen when the web page containing the error is requested by a user, the contents of any loaded web page data representing the appearance of the browser screen upon occurrence of the error; and
wherein transmitting the performance metrics associated with execution of the transaction defined by the script to a repository comprises:

transmitting the captured contents of any loaded web page data to the repository to allow a user of the repository to view a rendition of how the browser screen would have appeared upon the error to an actual user.

21. The computer system of claim 17 wherein when the computer system performs the operation of identifying respective performance metrics associated with obtaining respective objects defined within each web page, the computer system performs operations of:
  tracking a content type of a first object, the content type indicating a type of object downloaded using the uniform resource locator for the first object as specified in the web page;
  identifying, in the performance metrics, the uniform resource locator host and uniform resource locator page used to obtain the first object; and
  identifying, in the performance metrics, a response code associated with downloading the first object, the response code indicating success or failure of downloading the first object.

* * * * *